United States Patent
Elzupir et al.

(10) Patent No.: US 12,491,169 B1
(45) Date of Patent: Dec. 9, 2025

(54) 1-NAPHTHALENYL AMINOETHYL SCHIFF BASE AND USE AS A DEATH LIGAND-1 INHIBITOR

(71) Applicant: IMAM MOHAMMAD IBN SAUD ISLAMIC UNIVERSITY, Riyadh (SA)

(72) Inventors: Amin Osman Elzupir, Riyadh (SA); Sondos A. J. Almahmoud, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/097,284

(22) Filed: Apr. 1, 2025

(51) Int. Cl.
*A61K 31/15* (2006.01)

(52) U.S. Cl.
CPC .................................. *A61K 31/15* (2013.01)

(58) Field of Classification Search
None
See application file for complete search history.

(56) References Cited

FOREIGN PATENT DOCUMENTS

| CN | 118666817 A | 9/2024 |
|---|---|---|
| CN | 118717971 A | 10/2024 |

OTHER PUBLICATIONS

PubChem Compound CID 135774281 (created date: Jan. 17, 2019).*
Acta Pharmacologica Sinica, 42:1-9, 2021.*
K. M. Tawfiq, et al., "Synthesis, Characterization, Molecular Docking, Cytotoxicity, and Antimicrobial Activity of Schiff Base Ligand and Its Metal Complexes", Applied Organometallic Chemistry. vol. 39, e7781, 2025, e7781, 13 pages.

* cited by examiner

*Primary Examiner* — Bong-Sook Baek
(74) *Attorney, Agent, or Firm* — Oblon, McClelland, Maier & Neustadt, L.L.P.

(57) ABSTRACT

A method of inhibiting a Programmed Cell Death Protein 1 (PD-1) or Programmed Death-Ligand 1 (PD-L1) protein includes reacting an N-(naphthyl)-ethylenediamine dihydrochloride ($C_{12}H_{16}N_2 \cdot 2HCl$) with an aldehyde (R—CHO) in ethanol ($CH_3CH_2OH$) in the presence of sodium bicarbonate ($NaHCO_3$) to obtain a reaction mixture. The reaction mixture is then refluxed for 3 hours (h) to 7 h, yielding an aminoethyl Schiff base which is then contacted with PD-1 or PDL-1 protein to form a PD-1 or PDL-1 protein complex.

16 Claims, 41 Drawing Sheets

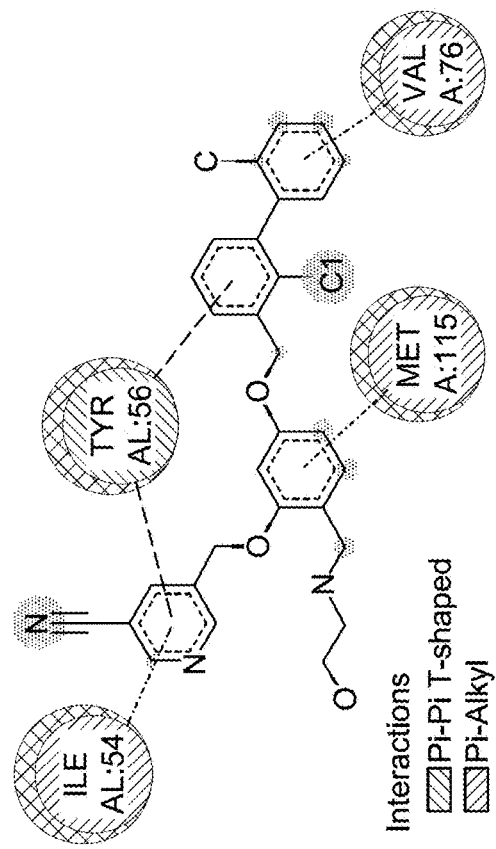
FIG. 24A
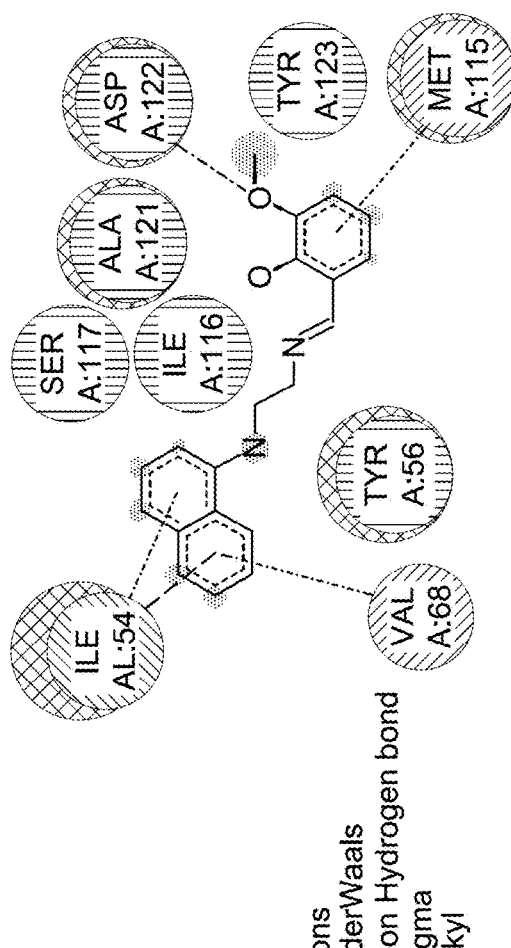
FIG. 24B
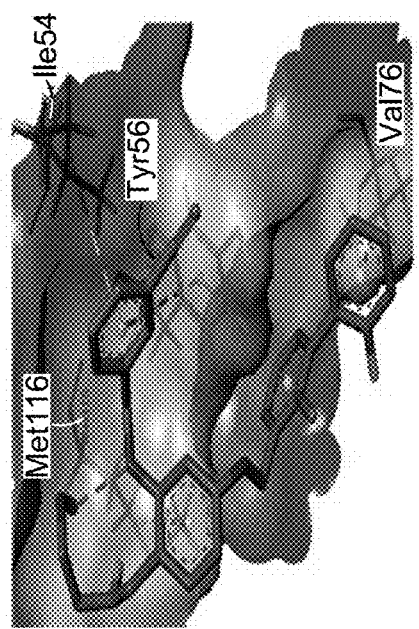
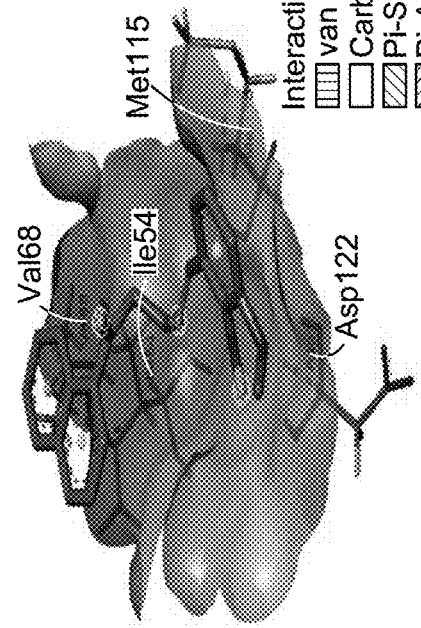

1-NAPHTHALENYL AMINOETHYL SCHIFF BASE AND USE AS A DEATH LIGAND-1 INHIBITOR

BACKGROUND

Technical Field

The present disclosure is directed towards a technique to inhibit protein activity, and more particularly, towards a method of reducing the activity of Programmed Cell Death Protein 1 (PD-1) or Programmed Death-Ligand 1 (PD-L1) proteins using Schiff base compound for cancer treatment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Cancer remains a significant global health challenge, ranking among the most diagnosed malignancies and causing high mortality. Uncontrolled cell growth leads to the formation of benign or malignant tumors, which may invade surrounding tissues and spread to other parts of the body. Conventional treatments such as surgery, chemotherapy, and radiation face limitations like drug resistance, toxicity, and lack of selectivity. Immune evasion in cancer involves pathways like cytotoxic T-lymphocyte antigen 4 (CTLA-4), T-cell immunoglobulin (TIM-3) and mucin-domain-containing-3, lymphocyte-activation gene 3 (LAG-3), and (PD-1) programmed cell death protein 1/(PD-L1) programmed cell death ligand 1, which suppress T-cell activation and aid tumor survival. A crucial challenge is immune evasion by tumors via the PD-1/PD-L1 pathway, which suppresses T-cell activation and aids tumor survival. Additionally, PD-1, an immune checkpoint receptor, is expressed in T-lymphocytes (T), B-lymphocytes (B), and natural killer T (NKT) cells, with increased levels during immune activation. Its ligands, PD-L1 and PD-L2, are overexpressed in cancers such as ovarian, renal, colorectal, pancreatic, liver, and melanoma, correlating with poor prognosis and reduced survival. Tumor immunotherapy targets to enhance the immune system's natural antitumor response to eliminate cancer cells. Therefore, research is focused on developing inhibitors targeting these pathways, including combination therapies and small-molecule inhibitors, to enhance immune responses and improve cancer treatment outcomes.

Immunotherapy has shown success in cancers like bladder carcinoma, Hodgkin's lymphoma, melanoma, and renal cell carcinoma. Monoclonal antibodies targeting immune checkpoints like CTLA-4, TIM-3, LAG-3, and PD-1/PD-L1 have shown significant potential in boosting immune responses against tumors. Therapies such as ipilimumab (CTLA-4) and pembrolizumab (PD-1) have demonstrated effectiveness, but challenges like long half-life, poor cell penetration, immunogenicity, and high cost persist. Despite the success of PD-1/PD-L1 inhibitors like pembrolizumab, nivolumab, and atezolizumab, the limitations of monoclonal antibodies remain. Consequently, numerous approaches are being opted to improve the effectiveness of immunotherapy.

Among the most promising strategies is blocking PD-1 and PD-L1, transmembrane receptors that suppress T cell activation. Their interaction induces T cell apoptosis, promotes anergy, and contributes to immune exhaustion. Many aggressive malignancies, including breast, pancreatic, and non-small cell lung carcinoma, exhibit PD-L1 overexpression, enabling tumors to escape immune surveillance and resist treatment. To counteract immune evasion, PD-1/PD-L1 inhibitors have emerged as a critical advancement in immunotherapy, disrupting the PD-1/PD-L1 interaction between cancer and T cells. The first FDA-approved PD-L1 inhibitor, atezolizumab, was followed by durvalumab and avelumab. Additionally, multiple PD-1 monoclonal antibodies have received FDA approval, including pembrolizumab, nivolumab, camrelizumab, cemiplimab, sintilimab, and others. While monoclonal antibodies have demonstrated clinical success, their limitations include long half-life, low oral bioavailability, poor cell penetration, immunogenicity, and high production costs.

Contrasting monoclonal antibodies, small molecules offer improved drug delivery, better tumor penetration, and reduced immune-related side effects while enabling cost-effective production. Consequently, small-molecule PD-1/PD-L1 inhibitors represent a favorable therapeutic strategy to enhance cancer immunotherapy while addressing the drawbacks associated with monoclonal antibodies. Therefore, recent advancements focus on small molecules, which are being explored in combination therapies to enhance efficacy and overcome the limitations of monoclonal antibodies, driving effective progress in cancer treatment outcomes. However, challenges remain in optimizing efficacy, bioavailability, and overcoming resistance and toxicity in long-term use.

Accordingly, one object of the present disclosure is to provide a method for inhibiting PD-1 or PD-L1 proteins using Schiff base compounds for the treatment of cancer cells, which may circumvent the drawbacks and limitations, such as non-selectivity, toxicity, drug resistance, and poor tumor penetration, of the materials and methods already known in art.

SUMMARY OF THE INVENTION

In an exemplary embodiment, a method of inhibiting a programmed cell death protein 1 (PD-1)/programmed cell death ligand 1 (PD-L1) protein is described. The method includes reacting an N-(naphthyl)-ethylenediamine dihydrochloride ($C_{12}H_{16}N_2 \cdot 2HCl$) with an aldehyde (R—CHO) of formula (I) in ethanol ($CH_3CH_2OH$) in the presence of sodium bicarbonate ($NaHCO_3$) to form a reaction mixture. Furthermore, refluxing the reaction mixture for 3 hours (h) to 7 h to form an aminoethyl Schiff base of Formula (II), and contacting the aminoethyl Schiff base with the PD-1 or PDL-1 protein to form a PD-1 or PDL-1 protein complex,

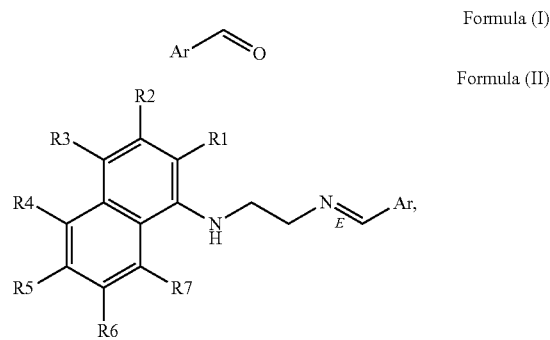

Formula (I)

Formula (II)

where:
R1 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group;
R2 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group;
R3 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group;
R4 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group
R5 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group
R6 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group
R7 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group.

In some embodiments, the reacting includes stirring the reaction mixture at a temperature of 20 degrees Celsius (° C.) to 25° C. for 1 h to 3 h, and Ar is selected from the group including

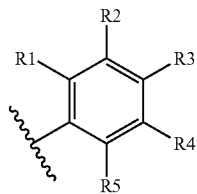

where:
R1 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group;
R2 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group;
R3 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group;
R4 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group;
R5 could be hydrogen, halogen, nitro, hydroxyl, methoxy, amino, N,N dimethyl, pyrrolidinyl, morpholinyl, piperazinyl, nitrile, thiomethyl, thioethyl, or methyl sulfonyl group.

In some embodiments, a molar ratio of N-(naphthyl)-ethylenediamine dihydrochloride to NaHCO$_3$ is 1:5 to 5:1.

In some embodiments, the ethylenediamine dihydrochloride is at least one selected from the group including N-(4-nitro-1-naphthyl)ethylenediamine dihydrochloride, N-(2-nitro-1-naphthyl)ethylenediamine dihydrochloride, N-(1-methoxynaphthyl)ethylenediamine dihydrochloride, N-(2-naphthyl)ethylenediamine dihydrochloride, N-(9-anthryl)ethylenediamine dihydrochloride, N-phenylethylenediamine dihydrochloride, and N-(1-naphthyl)ethylenediamine dihydrochloride.

In some embodiments, the aminoethyl Schiff base has a Fourier transform infrared (FT-IR) spectrum including a wide absorption band at 200 nanometer (nm) to 385 nm.

In some embodiments, the refluxing includes refluxing for about 5 h.

In some embodiments, the ethylenediamine dihydrochloride is N-(1-Naphthyl)ethylenediamine dihydrochloride.

In some embodiments, the method includes a molar ratio of N-(naphthyl)-ethylenediamine dihydrochloride to sodium bicarbonate (NaHCO$_3$) is 1:3 to 1:2.

In some embodiments, the aminoethyl Schiff base has a binding percent of at least 60% to the PDL-1 protein.

In some embodiments, the reacting includes stirring the reaction mixture at a temperature of 20° C. to 25° C. for about 2 h.

In some embodiments, the aminoethyl Schiff base has a binding percent of at least 75% to the PDL-1 protein.

In some embodiments, the aminoethyl Schiff base has a binding affinity of at least −6 kilocalorie per mole (kcal/mol) to the PDL-1 protein.

In some embodiments, the aminoethyl Schiff base has an FT-IR spectrum including a maximum absorption at 200 nm to 255 nm and at 300 nm to 340 nm.

In some embodiments, the aminoethyl Schiff base has a binding affinity of at least −6.5 kcal/mol to the PDL-1 protein.

In some embodiments, the aminoethyl Schiff base has an optical band gap ($E_{opt}$) of 2.50 electron volt (eV) to 3.50 eV In some embodiments, Ar is a 2-methoxyphenol and the aminoethyl Schiff base has a binding affinity of 65% to 70%.

In some embodiments, Ar is a phenol and the aminoethyl Schiff base has a binding affinity of 85% to 90%.

In some embodiments, the aminoethyl Schiff base has an optical band gap ($E_{opt}$) of 2.77 eV to 3.40 eV In some embodiments, Ar is a 2-nitrobenzene and the aminoethyl Schiff base has a binding affinity of 75% to 80%

In some embodiments, Ar is a benzene and the aminoethyl Schiff base has a binding affinity of 65% to 70%.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 24A illustrates A56 reference docked with the PDL-1 active site in three dimensions and its two-dimensional interactions, according to certain embodiments.

FIG. 24B illustrates the three dimensions and the two-dimensional interactions of the candidate S1, according to certain embodiments.

DETAILED DESCRIPTION

Figure 1A:
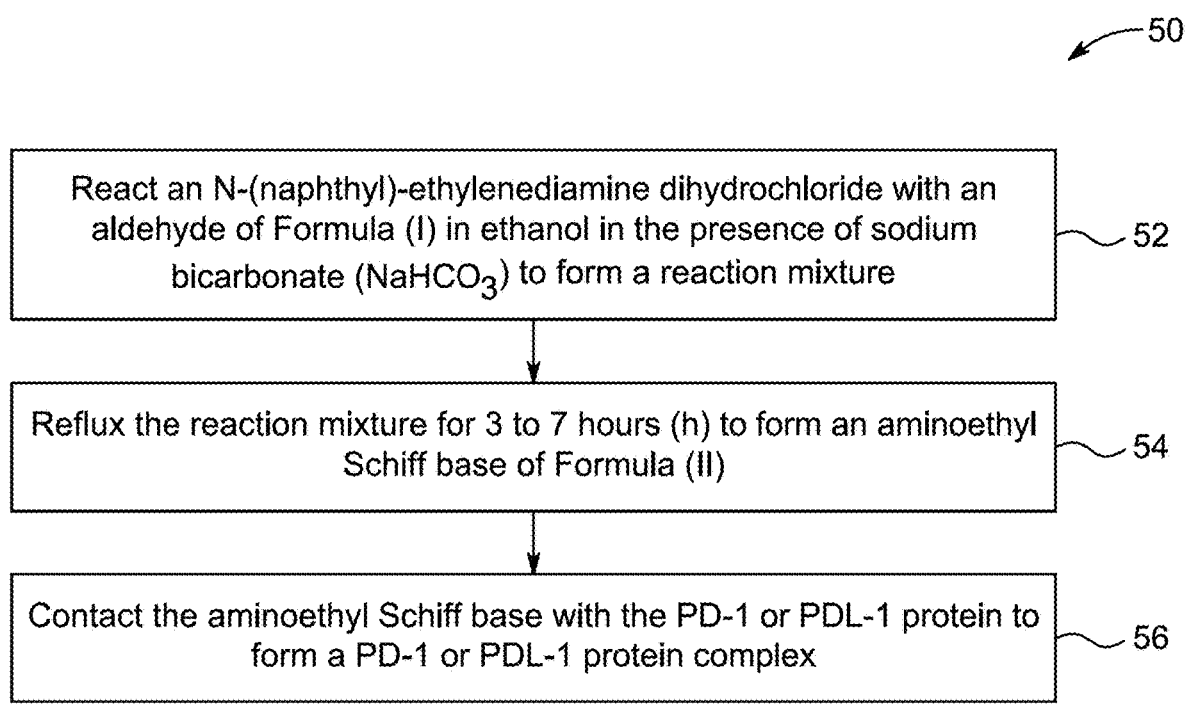
FIG. 1A illustrates a schematic flow chart of a method of inhibiting a Programmed Cell Death Protein 1 (PD-1) or Programmed Death-Ligand 1 (PD-L1) protein, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the level or concentration of one or more reactants, catalysts, or materials present in a reaction mixture.

As used herein, the term 'compound' refers to a chemical entity, regardless of its phase-solid, liquid, or gaseous-as well as its state-crude mixture, purified, or isolated.

As used herein, the term 'room temperature' refers to a temperature range of '25 degrees Celsius (° C.)±3° C. in the present disclosure.

As used herein, the term 'functional group' indicates specific groups of atoms within a molecular structure that are accountable for the characteristic chemical reactions and chemical properties of that structure. Suitable examples of functional groups include hydrocarbons, groups containing halogen, groups containing oxygen (alcohol, acid, ketone, aldehydes), groups containing nitrogen (nitrile, amines, amides), groups containing silicon (silanes) and groups containing phosphorus and sulfur all identifiable by a skilled person.

As used herein, the term 'attach' or 'attachment' refers to linking or uniting by a bond, link, force, or tie in order to keep two or more parts together, which encompasses either direct or indirect attachment such that, for example, a first compound is directly bound to a second compound or material, and the embodiments wherein one or more intermediate compounds, and in particular molecules, are disposed between the first compound and the second compound or material.

As used herein, the term 'aromatic compounds' or 'aromatic rings', refer to hydrocarbon rings that, by the theory of Hückel, have a cyclic, delocalized (4n+2) pi-electron system. Non-limiting examples of aromatic compounds include benzene, benzene derivatives, compounds having at least one benzene ring in their chemical structure.

As used herein, the term 'amines' refer to the compounds and functional groups that contain a basic nitrogen atom with a lone pair. Amines are formally derivatives of ammonia ($NH_3$), where one or more hydrogen atoms have been replaced by a substituent such as an alkyl or aryl group (these may respectively be called alkylamines and arylamines; amines in which both types of substituents are attached to one nitrogen atom may be called alkylarylamines). Amines may include amino acids, biogenic amines, trimethylamine, and aniline. Inorganic derivatives of ammonia are also called amines, such as monochloramine ($NClH_2$).

As used herein, the term 'aromatic amine' refers to the organic compound including an aromatic ring attached to an amine. It is a broad class of compounds that encompasses anilines, but also many more complex aromatic rings and many amine substituents beyond $NH_2$.

As used herein, the term 'hydroxyl group' refers to the functional group with the chemical formula —OH and composed of one oxygen atom covalently bonded to one hydrogen atom.

As used herein, the term 'halogen group' refers to the group in the periodic table including six chemically related elements: fluorine (F), chlorine (Cl), bromine (Br), or iodine (I).

As used herein, the term 'phenol' is an organic compound including a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

As used herein, the term 'Schiff base' refers to a class of organic compounds that are typically characterized by the presence of a functional group known as an imine (—C=N—). This imine group is formed through a condensation reaction between a primary amine (—$NH_2$) and a carbonyl compound, such as an aldehyde or ketone. The general structure of a Schiff base can be represented as R1R2C=NR3, where R1 and R2 are groups that are derived from the aldehyde or ketone, and R3 is an organic group derived from the amine.

Schiff bases are important due to their ability to coordinate with metal ions, forming metal-Schiff base complexes, which can exhibit a wide range of catalytic, optical, and chemical properties. These compounds are used in various applications, including catalysis, sensing, and as intermediates in organic synthesis. The versatility of Schiff bases arises from their tuneable electronic and steric properties, which depend on the substituents present on the aldehyde/ketone and amine components.

As used herein, the term 'lipophilic functional units' refers to chemical groups or components that have an affinity for, or are soluble in, lipids or non-polar solvents. These units typically consist of hydrocarbon chains or aromatic rings that are non-polar or only weakly polar, allowing them to interact favorably with hydrophobic environments. Lipophilic functional units are commonly incorporated into molecules to enhance their ability to permeate cell membranes or to improve their solubility in lipid-rich environments. These units play a crucial role in the pharmacokinetic properties of compounds, particularly in drug delivery and absorption. For example, alkyl groups, aromatic rings, fatty acid chains, cholesterol derivatives, tert-butyl groups and fluorinated compounds.

As used herein, the term 'hydrophilic functional units' refers to chemical groups or components that have an affinity for, or are soluble in, water or polar solvents. These units typically contain polar or charged groups, which can form hydrogen bonds or ionic interactions with water molecules, making them soluble in aqueous environments. Hydrophilic functional units are often incorporated into molecules to improve their water solubility, bioavailability, and interaction with biological systems. Examples of hydrophilic functional units include hydroxyl groups, carboxyl groups, amino groups, sulfate groups, phosphate groups, ether groups and sugar units.

As used herein, the term 'PD-L1 protein complex' refers to the molecular structure formed when the PD-L1 (Programmed Death-Ligand 1) protein binds to its receptor, PD-1 (Programmed Death-1), which is expressed on the surface of immune cells, such as T-cells. This interaction plays a key role in immune regulation by inhibiting T-cell activation and preventing excessive immune responses. The PD-L1 protein complex is often utilized by cancer cells as a mechanism to evade immune detection, effectively dampening the immune system's ability to recognize and attack tumor cells. In the context of cancer immunotherapy, targeting the PD-L1/PD-1 interaction with specific inhibitors can restore the immune system's ability to recognize and destroy cancer cells.

As used herein, the term 'cancer immunotherapy' refers to a type of cancer treatment that utilizes the body's immune system to identify, attack, and destroy cancer cells. This approach can involve various strategies, such as the use of immune checkpoint inhibitors, monoclonal antibodies, cancer vaccines, or adoptive cell transfer, to enhance the immune system's ability to recognize and eliminate tumors. Cancer immunotherapy aims to specifically target cancer cells while minimizing damage to normal, healthy tissue. There are several types of cancer immunotherapy, including: Monoclonal Antibodies: These are lab-made molecules that can target specific antigens found on the surface of cancer cells. By binding to these antigens, they either directly inhibit the cancer cell's growth or flag them for destruction by the immune system; Immune Checkpoint Inhibitors: cancer cells often exploit certain checkpoint proteins like PD-1 and PD-L1 to avoid detection by the immune system. Checkpoint inhibitors block these proteins, effectively 'lifting the brakes' on the immune system, allowing it to better target and destroy cancer cells; Cancer Vaccines: these vaccines aim to stimulate the immune system to recognize and fight cancer cells. Unlike preventive vaccines (like those for the flu or measles), cancer vaccines are typically used to treat existing cancer by prompting the immune system to attack cancer cells bearing specific antigens; Adoptive Cell Transfer (ACT): this involves extracting immune cells, often T-cells, from a patient, modifying them in a lab to make them more effective at fighting cancer, and then reinfusing them back into the patient's body. One common form of ACT is CAR-T cell therapy, where T-cells are engineered to express chimeric antigen receptors (CARs) that specifically target cancer cells; Cytokine Therapy: cytokines are proteins that can help regulate immune system activity. Some immunotherapies involve the use of cytokines, like interleukins or interferons, to enhance the immune response and boost the body's ability to fight cancer.

As used herein, the term 'binding energy' refers to the amount of energy required to break the interaction between two or more molecules, ions, or other entities that are bound together by a specific force, such as a covalent bond, ionic interaction, hydrogen bond, or van der Waals force. Binding energy can be measured in units of energy, such as kilocalories per mole (kcal/mol), and is indicative of the stability of the complex formed by the binding entities. The higher binding energy generally correlates with stronger binding affinity and greater stability of the resulting complex. Binding energy can be determined experimentally through techniques such as calorimetry, spectroscopy, or computational modeling.

As used herein, the term 'optical band gap' refers to the energy difference between the highest occupied electronic state and the lowest unoccupied electronic state in a material, as observed in its absorption or transmission of light. This gap determines the material's ability to absorb or emit photons of specific wavelengths. The optical band gap is a crucial property in materials used for optoelectronic devices, such as solar cells, light-emitting diodes, and photodetectors, as it dictates the range of wavelengths the material can effectively interact with.

As used herein, the term 'Fourier-transform infrared (FT-IR) spectrum' refers to a spectroscopic technique that measures how a sample absorbs infrared light at different wavelengths, revealing the vibrational modes of its molecular bonds. The resulting spectrum displays peaks that correspond to specific functional groups in the sample, allowing for compound identification. FT-IR is widely used in chemical analysis for both qualitative and quantitative purposes.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{11}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspect of the present disclosure is directed to a method of synthesizing, 1-naphthalenyl aminoethyl Schiff base derivatives with a combination of lipophilic and hydrophilic functional units, linked via a Schiff base group, as potential PD-L1 inhibitors. Absorption, distribution, metabolism, and excretion (ADME) analysis demonstrated favorable drug-likeness properties for these Schiff base compounds. The present disclosure provides valuable insights into 1-naphthalenyl aminoethyl Schiff base derivatives as candidates for cancer immunotherapy through PD-L1 inhibition.

FIG. 1 illustrates a schematic flow chart of a method 50 of inhibiting a PD-1 or PDL-1 protein. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes reacting an N-(naphthyl)-ethylenediamine dihydrochloride with an aldehyde of Formula (I) in ethanol in the presence of sodium bicarbonate ($NaHCO_3$) to form a reaction mixture. Suitable examples of aldehydes include formaldehyde, acetaldehyde, benzaldehyde, butanal, hexanal, octanal, nonanal, decanal, glutaraldehyde, salicylaldehyde, cinnamaldehyde, isovaleraldehyde, crotonaldehyde, toluene-4-aldehyde, phenylacetaldehyde, pyridine-3-carbaldehyde, naphthaldehyde, and their derivatives. In a preferred embodiment, aldehyde used in of Formula (I).

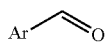

Formula (I)

In some embodiments, the ethylenediamine dihydrochloride is at least one selected from the group including N-(4-nitro-1-naphthyl)ethylenediamine dihydrochloride, N-(2-nitro-1-naphthyl)ethylenediamine dihydrochloride, N-(1-methoxynaphthyl)ethylenediamine dihydrochloride, N-(2-naphthyl)ethylenediamine dihydrochloride, N-(9-anthryl)ethylenediamine dihydrochloride, N-phenylethylenediamine dihydrochloride, and N-(1-naphthyl)ethylenediamine dihydrochloride. In a preferred embodiment, the ethylenediamine dihydrochloride is N-(1-naphthyl)ethylenediamine dihydrochloride.

In some embodiments, a molar ratio of N-(naphthyl)-ethylenediamine dihydrochloride to $NaHCO_3$ is 1:5-5:1, preferably 1:4-4:1, preferably 1:3-3:1, preferably 1:2-2:1, and preferably 1:1. In some embodiments, a molar ratio of N-(naphthyl)-ethylenediamine dihydrochloride to $NaHCO_3$ is 1:3-1:2, and preferably 1:2.75-1:2.25. In a preferred embodiment, a molar ratio of N-(naphthyl)-ethylenediamine dihydrochloride to $NaHCO_3$ is 1:2.5. The primary function of $NaHCO_3$ is to neutralize N-(1-Naphthyl)ethylenediaminedihydrochloride, resulting in its corresponding free amine. It also facilitates the formation of the Schiff base by deprotonating the amine.

In some embodiments, the reacting includes stirring the reaction mixture at a temperature of 20-25° C., preferably 21-24° C., and preferably 22-23° C. for 1-3 hours (h), preferably 1.5-2.5 h, preferably 1.75-2.25 h, and more preferably 2 h. In alternate embodiments, the reaction may be done via swirling, sonicating, or a combination thereof.

At step 54, the method 50 includes refluxing the reaction mixture for 3-7 h, preferably 4-6 h, and preferably 5 h to form an aminoethyl Schiff base of Formula (II). Refluxing is a process that involves vapor condensation and the return of the condensate to the source system. It finds application in both industrial and laboratory distillations. During the refluxing process, the reaction mixture is heated to a controlled temperature, ensuring that the reaction proceeds efficiently while maintaining the necessary conditions for the formation of the Schiff base. Refluxing facilitates the continuous reaction by preventing the loss of volatile solvents or reagents, thereby ensuring that the reaction components remain in the reaction flask for the duration of the process.

In a preferred embodiment, the reaction mixture is refluxed for about 5 h to form an aminoethyl Schiff base of Formula (II). It allows sufficient time for the formation of the Schiff base without overextending the reaction time. This duration also minimizes the risk of unwanted side reactions or decomposition, promoting the desired product's purity.

In a preferred embodiment, the formula (II) is:

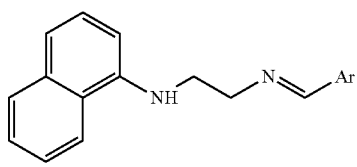

Formula (II)

In some embodiments, Ar is selected from the group including:

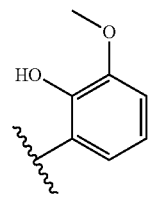

S1

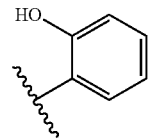

S2

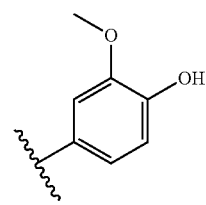

S3

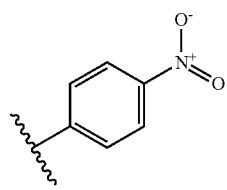

S4

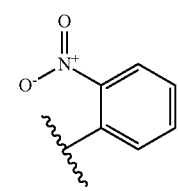

S5

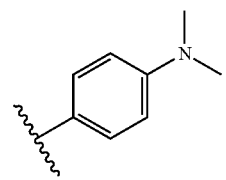

S6

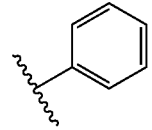

S7

At step 56, the method 50 includes contacting the aminoethyl Schiff base with the PD-1 or PDL-1 protein to form a PD-1 or PDL-1 protein complex. The aminoethyl Schiff base may be contacted with the PD-1 or PDL-1 protein after first undergoing purification by, for example, crystallization or chromatography.

In some embodiments, the aminoethyl Schiff base has a FT-IR spectrum including a wide absorption band at 200-385 nm, preferably 210-380 nm, preferably 220-375 nm, preferably 230-370 nm, preferably 240-365 nm, preferably 250-360 nm, preferably 260-355 nm, preferably 270-350 nm, preferably 280-345 nm, preferably 290-340 nm, preferably 300-335 nm, preferably 310-330 nm, and preferably 320-325 nm. In some embodiments, the aminoethyl Schiff base has an FT-IR spectrum including a maximum absorption at 200-255 nm, preferably 205-250 nm, preferably 210-245 nm, preferably 215-240 nm, preferably 220-235 nm, and preferably 225-230 nm and at 300-340 nm, preferably 305-335 nm, preferably 310-330 nm, and preferably 315-325 nm. In a preferred embodiment, the aminoethyl Schiff base has an FT-IR spectrum including a maximum absorption at 200 nm and 330 nm.

In some embodiments, the aminoethyl Schiff base has a binding percent of at least 60%, preferably 65%, preferably 70%, preferably 75%, preferably 80%, preferably 85%, preferably 90%, preferably 95%, and preferably 100% to the PDL-1 protein. In some embodiments, the aminoethyl Schiff base has a binding percent of at least 75%, preferably 80%, preferably 85%, preferably 90%, preferably 95%, and preferably 100% to the PDL-1 protein. In a preferred embodiment, the aminoethyl Schiff base has a binding percent of 67%. In another preferred embodiment, the aminoethyl Schiff base has a binding percent of 100%.

In some embodiments, the aminoethyl Schiff base has a binding affinity of at least −6 kcal/mol to the PDL-1 protein. In some embodiments, the aminoethyl Schiff base has a binding affinity of at least −6.5 kcal/mol to the PDL-1 protein. In a preferred embodiment, the aminoethyl Schiff base has a binding affinity of −6.3 kcal/mol to the PDL-1 protein. In another preferred embodiment, the aminoethyl Schiff base has a binding affinity of −6.7 kcal/mol to the PDL-1 protein.

In some embodiments, the aminoethyl Schiff base has an optical band gap ($E_{opt}$) of 2.50-3.50 electron volt (eV), preferably 2.55-3.45 eV, preferably 2.60-3.40 eV, preferably 2.65-3.35 eV, preferably 2.70-3.30 eV, preferably 2.75-3.25 eV, preferably 2.80-3.20 eV, preferably 2.85-3.15 eV, preferably 2.90-3.10 eV, and preferably 2.95-3.05 eV. In a preferred embodiment the aminoethyl Schiff base has an $E_{opt}$ of 3.40 eV. In another preferred embodiment, the aminoethyl Schiff base has an $E_{opt}$ of 2.77 eV.

In some embodiments, Ar is a 2-methoxyphenol and the aminoethyl Schiff base has a binding affinity of 65-70%, preferably 66-69%, and preferably 67-68%. In a preferred embodiment, Ar is a 2-methoxyphenol and the aminoethyl Schiff base has a binding affinity of 67%. In some embodiments, Ar is a phenol and the aminoethyl Schiff base has a binding affinity of 85-90%, preferably 86-89%, and preferably 87-88%. In a preferred embodiment, the binding energy is Ar is a phenol and the aminoethyl Schiff base has a binding affinity of 89%. In some embodiments, Ar is a 2-nitrobenzene and the aminoethyl Schiff base has a binding affinity of 75 to 80%, preferably 76-79%, preferably 77-78%. In preferred embodiment, Ar is a 2-nitrobenzene and the aminoethyl Schiff base has a binding affinity of 78%. In some embodiments, Ar is a benzene and the aminoethyl Schiff base has a binding affinity of 65-70%, preferably 66-69%, and preferably 67-68%. In a preferred embodiment, the binding energy is Ar is a benzene and the aminoethyl Schiff base has a binding affinity of 67%.

EXAMPLES

The following examples demonstrate a method of inhibiting a Programmed Cell Death Protein 1 (PD-1) or Programmed Death-Ligand 1 (PD-L1) protein. The examples are provided solely for illustration and are not to be construed as limitations of the present disclosure, as many variations thereof are possible without departing from the spirit and scope of the present disclosure.

Example 1: Materials and Characterization Procedures

All reagents used in the present disclosure were purchased and used without further modification, unless otherwise stated. Melting points (Mp) were recorded on a Stuart Scientific melting point (SMP10) machine and were uncorrected. Proton ($^1H$) nuclear magnetic resonance (NMR) and carbon ($^{13}C$) NMR spectroscopy were recorded on a JEOL (JNM ECAII 600) spectrometer, with chemical shifts given in parts per million (ppm) and were referenced to tetramethylsilane (TMS), all coupling constants (J values) are in hertz (Hz). Ultraviolet-visible (UV-Vis) measurements were carried out using (Shimadzu UV-2600i) spectrometer. Fourier transform infrared (FT-IR) spectrum was recorded on Agilent Cary 630 FTIR spectrometer. Density functional theory (DFT) and time dependent (TD-DFT) calculations were performed using the ORCA version 5.0.3 quantum chemistry program package using and the input files were generated with the Avogadro 1.2.0 visualization software. Geometry optimization and frequency calculations were performed using the Becke, 3-parameter, Lee-Yang-Parr (B3LYP) functional, and 6-31+G(d,p) basis set. Vibrational frequency calculation was run to ensure no imaginary infrared (IR) vibrational frequencies were present, which indicates that the obtained calculations have true energy level minima.

Example 2: Synthesis of Aminoethyl Schiff Base

The synthesis procedure was carried out dissolving 0.2 gram (g), 0.78 millimoles (mmol) N-(1-Naphthyl)ethylenediamine dihydrochloride in 15 milliliters (mL) absolute ethanol ($CH_3CH_2OH$), and then 0.14 g, 1.68 mmol sodium bicarbonate ($NaHCO_3$) was added to the solution and the mixture was stirred at room temperature for 2 hours (h) to ensure thorough mixing and reaction initiation. Following this, the aldehyde compound (2) (1 equivalent) was added into the reaction mixture, which was subsequently refluxed for 5 h to facilitate product formation. After completion, the reaction mixture was allowed to cool to room temperature, leading to the precipitation of the desired product, which was collected by filtration. Compounds S1 to S7 were easily prepared by a simple and low-cost Schiff base reaction of N-(1-Naphthyl)ethylenediaminedihydrochloride 1 with the corresponding aldehyde 2 in the presence of $NaHCO_3$ and the target compounds were obtained in 68% to 98% yield. The main function of $NaHCO_3$ is to neutralize compound 1, resulting in its corresponding free amine. The target compounds were characterized using FT-IR, $^1H$-NMR, $^{13}C$-NMR, mass spectroscopy (MS) and UV-Vis analysis.

Figure 1B:
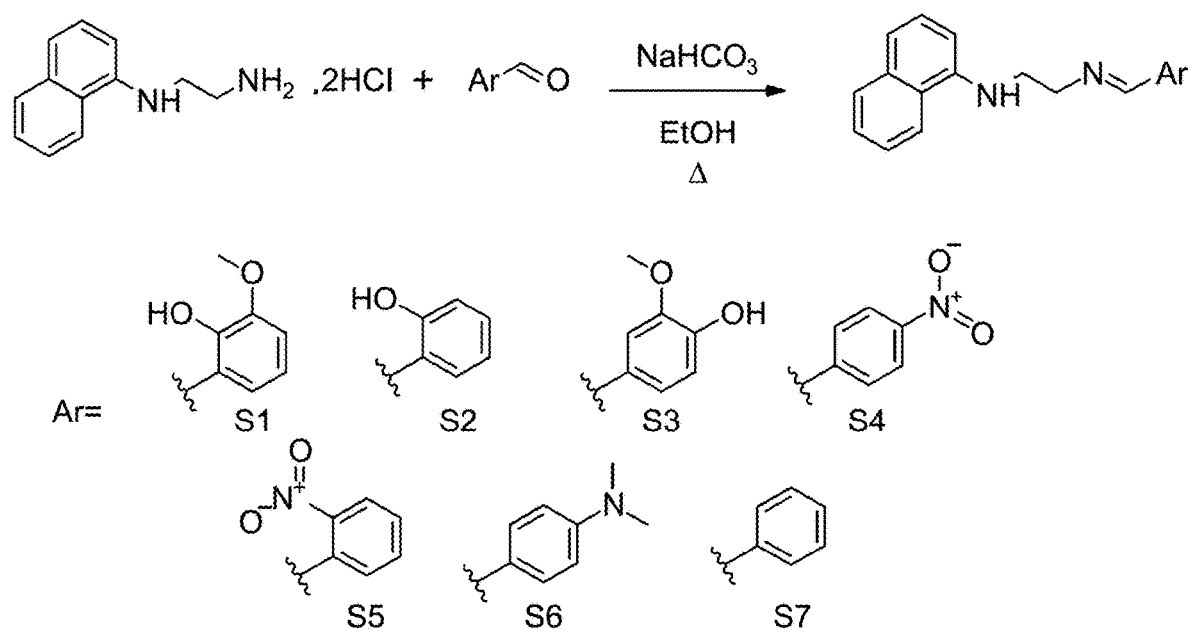
FIG. 1B is a schematic illustration of the synthesis pathway of different Schiff bases (compounds S1-S7), according to certain embodiments.
Figure 2A:
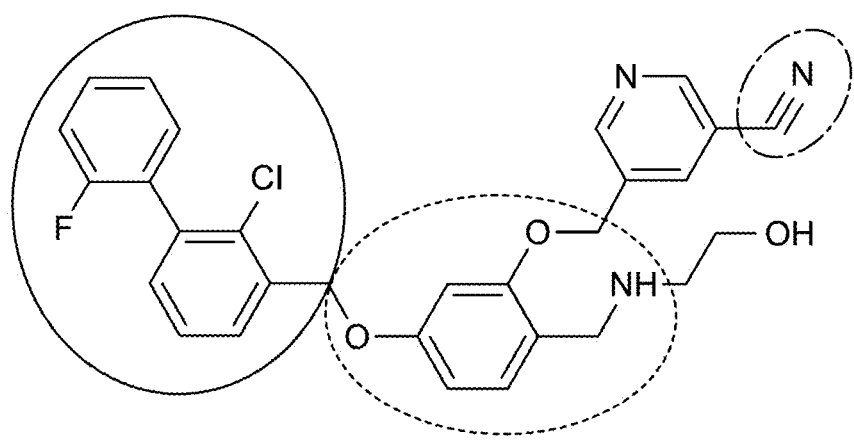
FIG. 2A is a schematic formula depicting a PDL-1 inhibitor compound A56, according to certain embodiments.
Figure 2B:
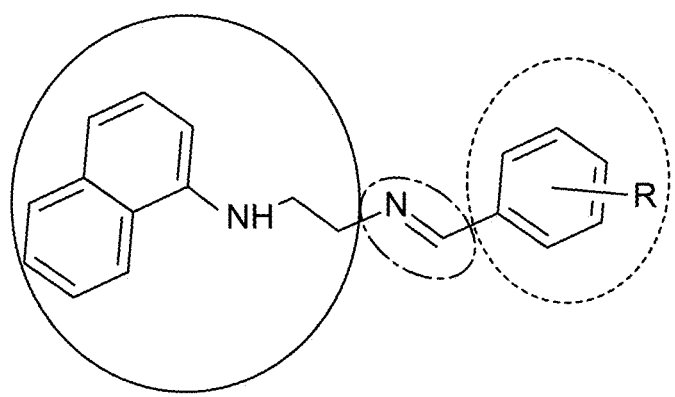
FIG. 2B is a schematic formula depicting target Schiff base compounds, according to certain embodiments.

FIG. 1B is a schematic illustration of the synthesis pathway of different Schiff bases (compounds S1-S7). FIG. 2A shows a schematic representation of the PDL-1 inhibitor compound A56. FIG. 2B depicts a schematic formula of the target Schiff base compounds.

Example 3: Molecular Docking

Molecular docking was carried out using the AutoDock Vina configure on the University of California, San Francisco (UCSF) Chimera. This employed a grid box with a size of 33.6 angstrom (Å), 51 Å, and 29 Å, centered at (18.4×−10.4×194) Å, maintaining the default parameter settings.

The View Dock feature was used to see the anticipated affinity score. Discovery Studio and UCSF Chimera tools were used to process and show the interaction between the ligands and the PDL-1 protein.

Example 4: Molecular Dynamics Simulations

UCSF Chimera was utilized to separate the docked inhibitors from the PDL-1 protein. Then the missed hydrogens atoms were added and saved as protein data bank (PDB) files using the assisted model building with energy refinement (AMBER) large-structure serial numbering. Antechamber and leap of amber tools 22 were used to create parameters and topology files. The inhibitors and the PDL-1 structure were assigned by the Amber force field of general amber force field 2 (GAFF2) and ff14SB, respectively. Each system was solvated using transferable intermolecular potential with 3 points (TIP3P) water molecules. The nanoscale molecular dynamics (NAMD) Simulation 3 software was utilized to do molecular dynamics (MD) simulations. The systems under test were minimized at 275 kelvins (K) for 10 picoseconds (ps). To increase the temperature gradually, the last frame was saved and minimized at 285 K or 5 ps. This step was repeated at the temperature of 285 K, and 294 K. Then, they were minimized at 303 K, and 310 K for 100 ps and 200 ps, respectively. Followed by 85 nanoseconds (ns) molecular dynamics (MD) simulations run at 310 K and a time step of 1 femtosecond (fs). Electrostatic interactions were calculated using the particle mesh Ewald technique and periodic boundary conditions. Using visual molecular dynamics (VMD) software, the trajectory was examined to determine the root-mean-square deviation (RMSD) and root-mean-square fluctuation (RMSF).

Example 5: Compounds S1 to S7

Figure 3A:
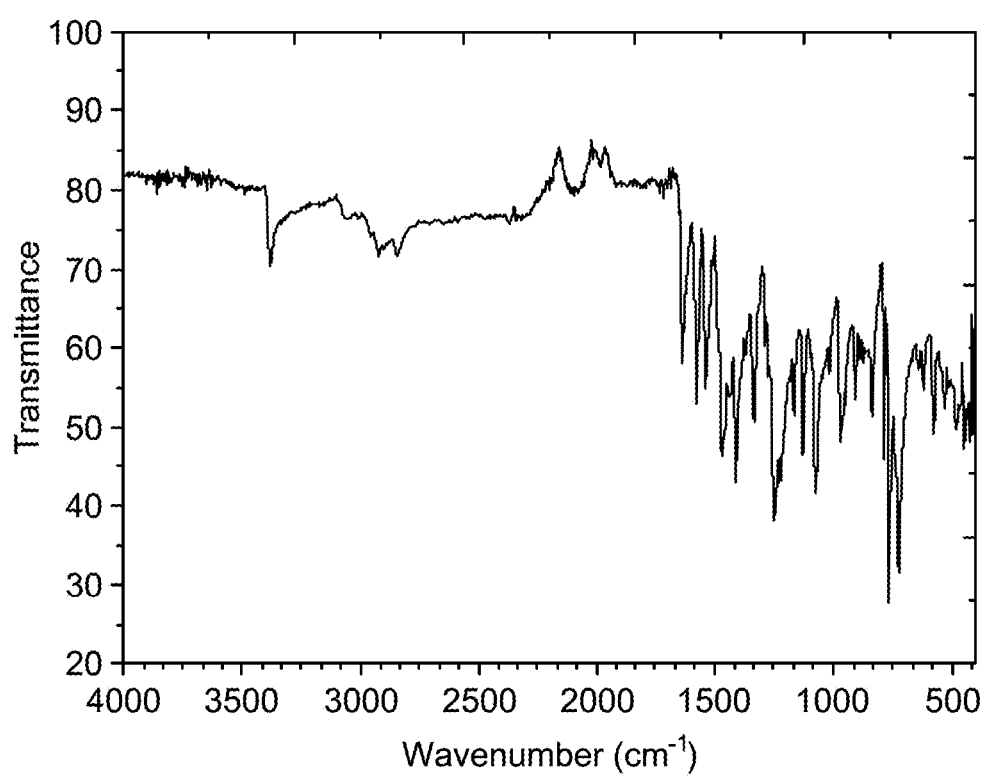
FIG. 3A shows a Fourier transform infrared (FT-IR) spectrum of S1, according to certain embodiments.
Figure 3B:
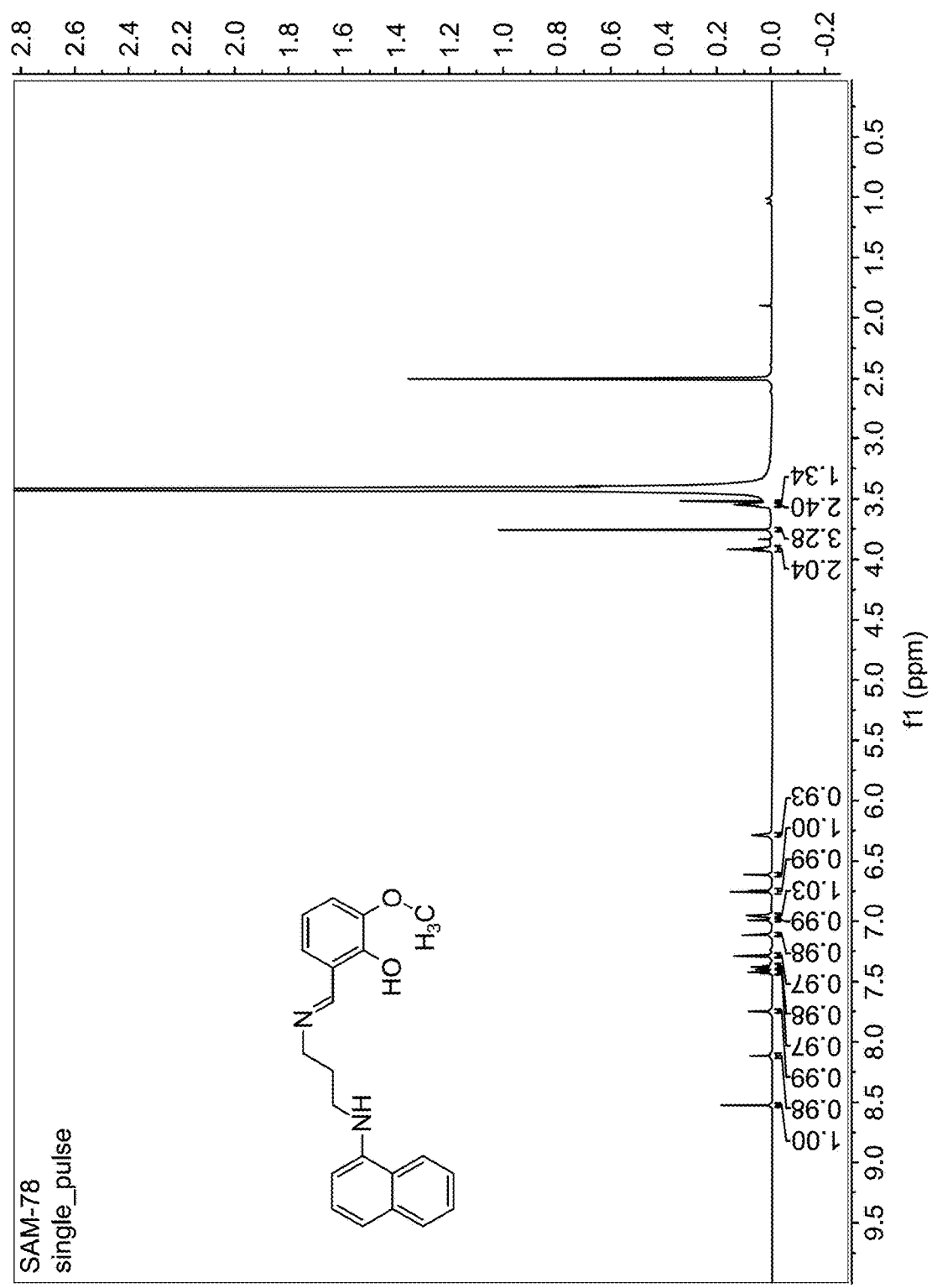
FIG. 3B is a proton nuclear magnetic resonance ($^1$H NMR) Spectrum of compound S1, according to certain embodiments.
Figure 3C:
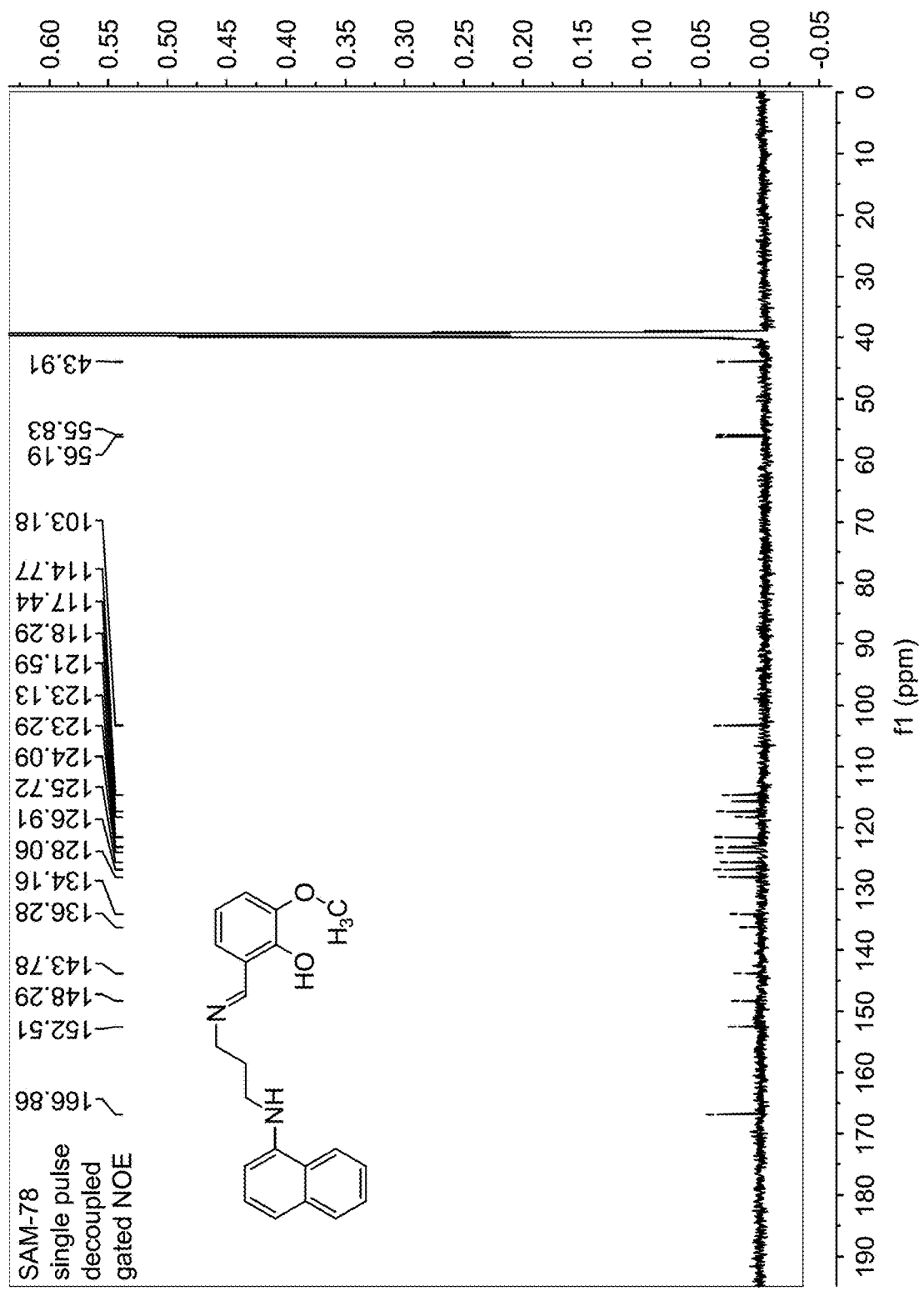
FIG. 3C is a carbon ($^{13}$C) NMR of compound S1, according to certain embodiments.

Compound S1: The precipitate formed during the reaction was carefully recrystallized by dissolving it in diethyl ether ($Et_2O$), followed by slow evaporation of the solvent to allow the compound to crystallize. This process resulted in the formation of the title compound (S1) as a light yellow solid. The final yield of the compound was 0.179 g, corresponding to a 72% yield. Mp 107° C.-110° C. Fourier transform infrared (FT-IR) ($v$, $cm^{-1}$); 3384 (N—H str), 2924 ($sp^2$=CH str), 2849 ($sp^3$-CH str), 1638 (C=N str), 1578 (C=C str), 1250 (C—O str), 1072 (C—N str) [as shown in FIG. 3A]. $^1$H NMR (600 MHz, DMSO-d6) δ 8.52 ($^1$H, s), 8.11 ($^1$H, d, J 8.4), 7.74 ($^1$H, d, J 7.8), 7.42 ($^1$H, t, J 7.6), 7.40-7.36 ($^1$H, m), 7.29 ($^1$H, t, J 7.8), 7.11 ($^1$H, d, J 8.1), 7.01-6.98 ($^1$H, m), 6.95 ($^1$H, dd, J 7.6, 1.1), 6.77-6.73 ($^1$H, m), 6.61 ($^1$H, d, J 7.6), 6.28 ($^1$H, t, J 5.5), 3.92 ($^2$H, t, J 6.1), 3.75 (3H, d, J 3.3), 3.55 ($^2$H, dd, J 12.0, 6.0), 3.52 ($^1$H, s) [as shown in FIG. 3B]. $^{13}$C NMR (100 MHz, dimethyl sulfoxide (DMSO)-d6) δ 166.8, 152.5, 148.2, 143.7, 136.2, 134.1, 128.0, 126.9, 125.7, 124.0, 123.2, 123.1, 121.5, 118.2, 117.4, 114.7, 103.1, 56.1, 55.8, 43.9 [as shown in FIG. 3C]. High-resolution mass spectrometry (HRMS) mass-to-charge ratio (m/z) Fourier transform mass spectrometry (FTMS) [M+Na]$^+$ 343. 1420 (requires 343.1422 for $C_{20}H_{20}N_2O_2Na$).

Figure 4A:
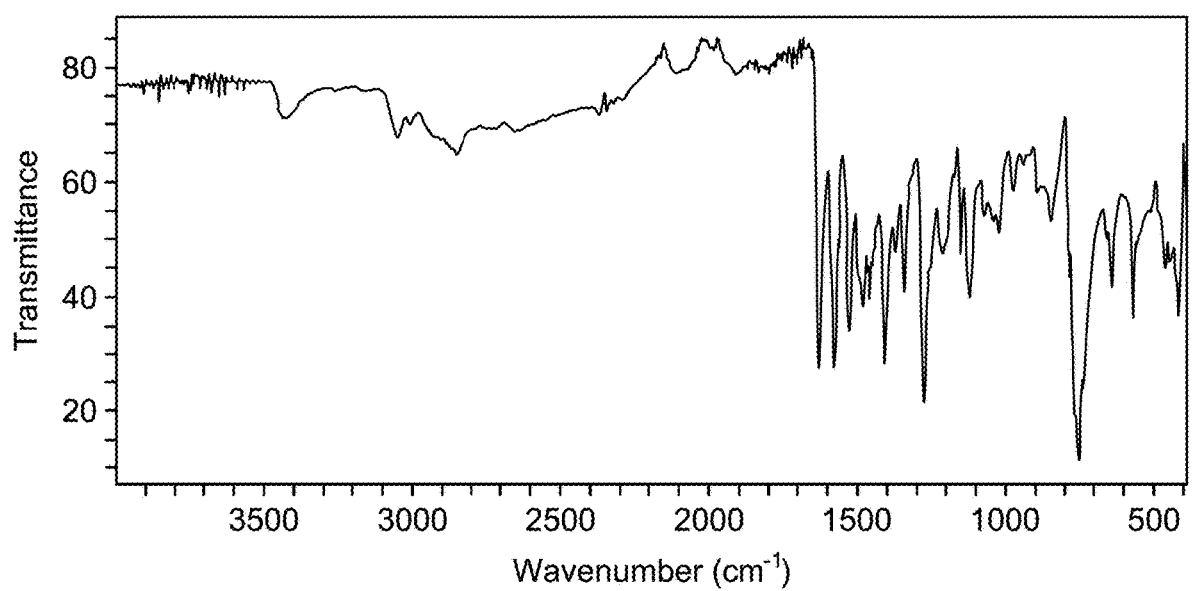
FIG. 4A shows a FT-IR spectrum of S2, according to certain embodiments.
Figure 4B:
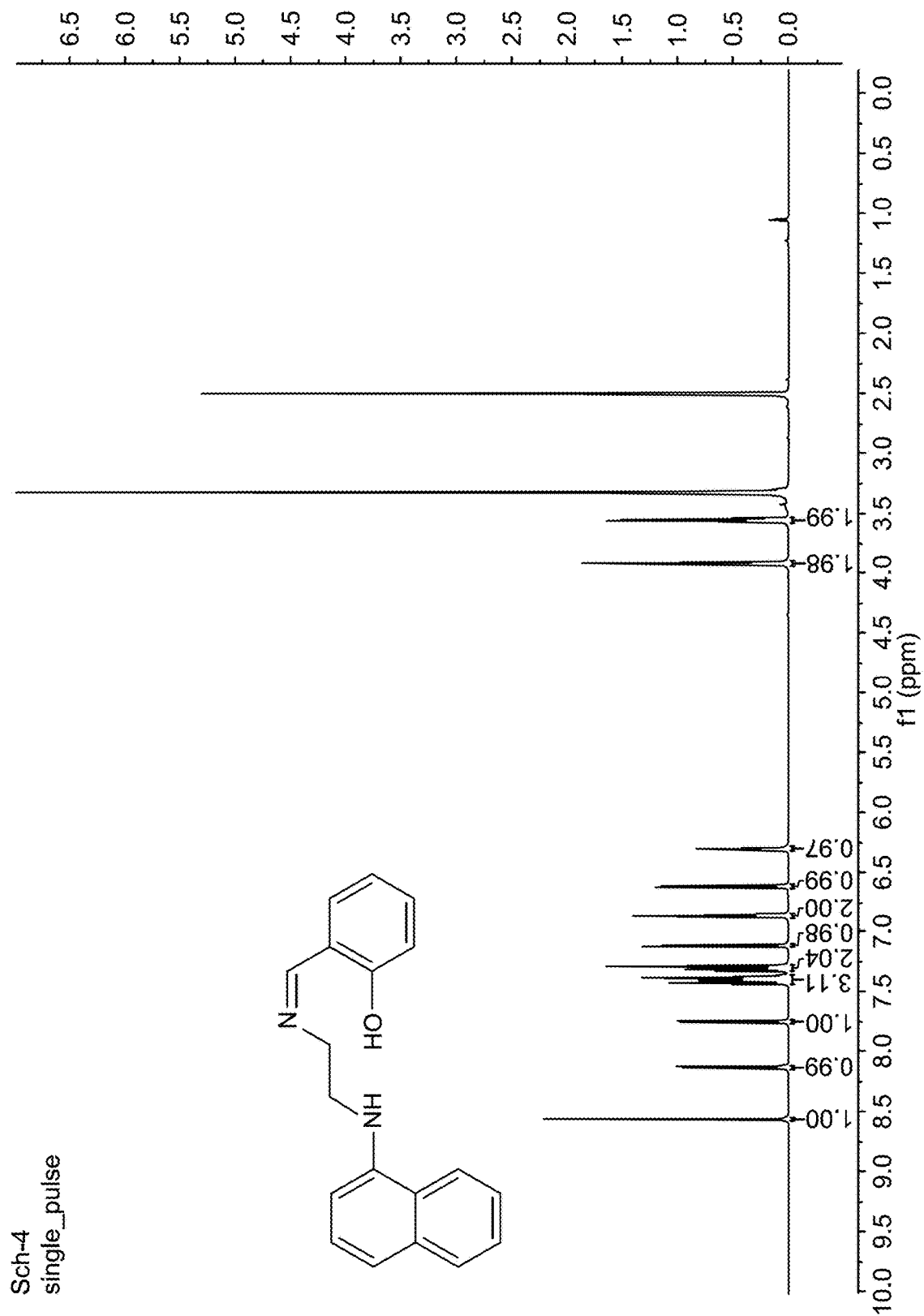
FIG. 4B is a $^1$H NMR spectrum of compound S2, according to certain embodiments.
Figure 4C:
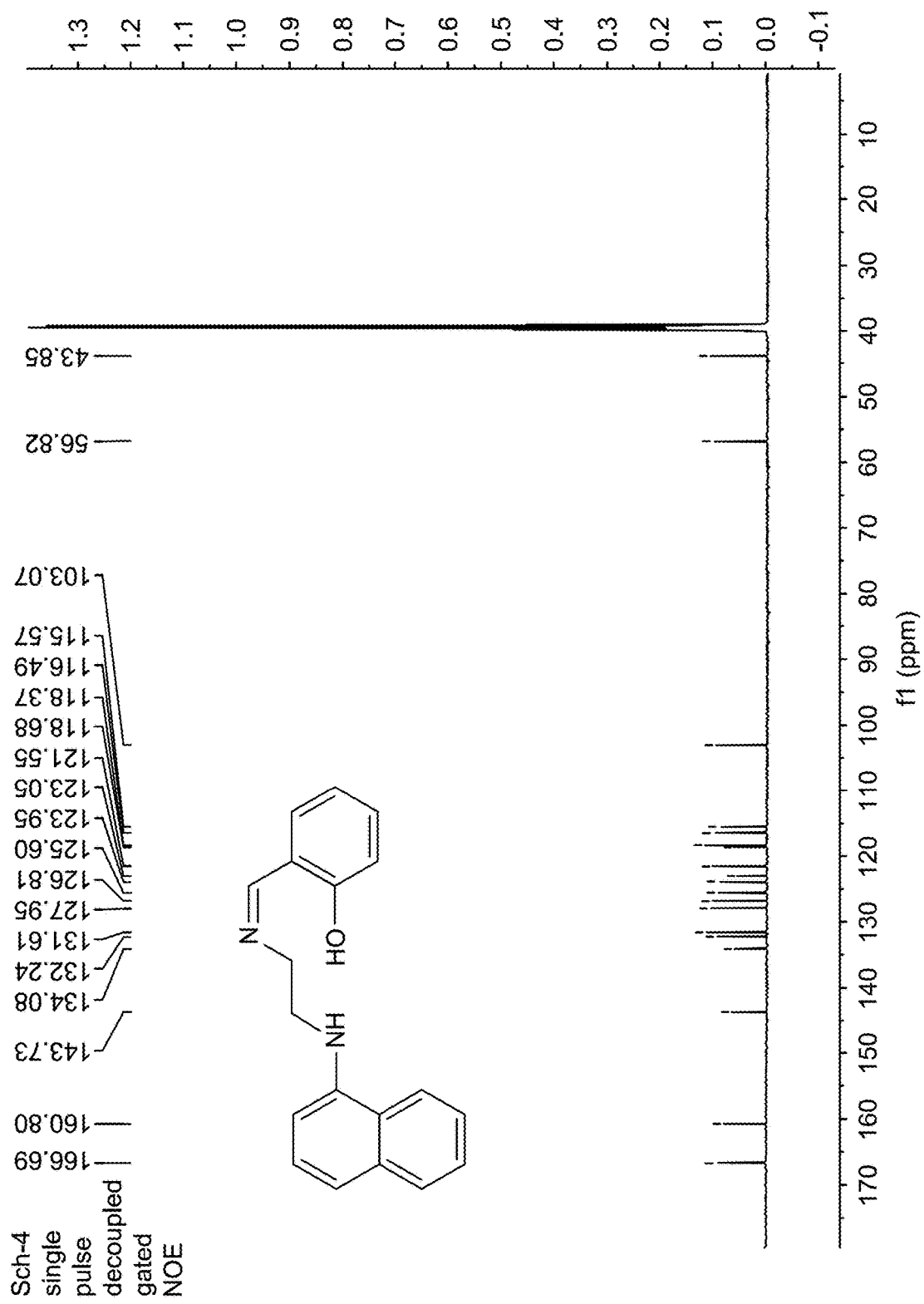
FIG. 4C is a $^{13}$C NMR spectrum of compound S2, according to certain embodiments.

Compound S2: The formed precipitate was recrystallized from 50% ethanol to give the target compound as brown oil, yielding 0.274 g, corresponding to a 90% yield. FT-IR ($v$, $cm^{-1}$); 3427 (N—H str), 3052 ($sp^2$=CH str), 2849 ($sp^3$-CH str), 1629 (C=N str), 1576 (C=C str), 1272 (C-0 str), 1118 (C—N str) [as shown in FIG. 4A]. $^1$H NMR (600 MHz, DMSO-d6) δ 8.56 (s, $^1$H), 8.13 (d, J=8.4 Hz, $^1$H), 7.76-7.73 (m, $^1$H), 7.44-7.36 (m, $^3$H), 7.33-7.27 (m, $^2$H), 7.11 (d, J=8.1 Hz, $^1$H), 6.88-6.85 (m, $^2$H), 6.62 (d, J=7.6 Hz, $^1$H), 6.31 (t, J=5.6 Hz, $^1$H), 3.92 (t, J=6.1 Hz, $^2$H), 3.56 (q, J=6.1 Hz, $^2$H) [as shown in FIG. 4B]. $^{13}$C NMR (151 MHz, DMSO-d6) δ 166.6, 160.8, 143.7, 134.0, 132.2, 131.6, 127.9, 126.81, 125.6, 123.9, 123.0, 121.5, 118.6, 118.3, 116.4, 115.5, 103.0, 56.8, 43.8 [as shown in FIG. 4C]. HRMS mass-to-charge ratio (m/z) atmospheric solids analysis probe (ASAP) [M+H]$^+$ 291.1491 (requires 291.1497 for $C_{19}H_{19}N_2O$).

Figure 5A:
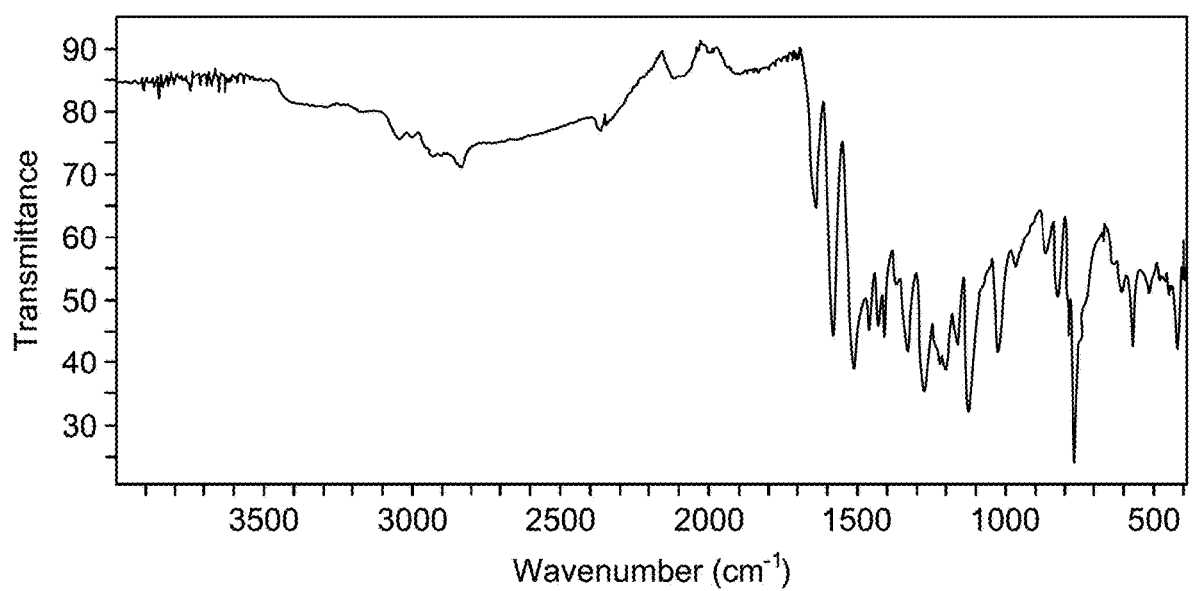
FIG. 5A shows a FT-IR spectrum of S3, according to certain embodiments.
Figure 5B:
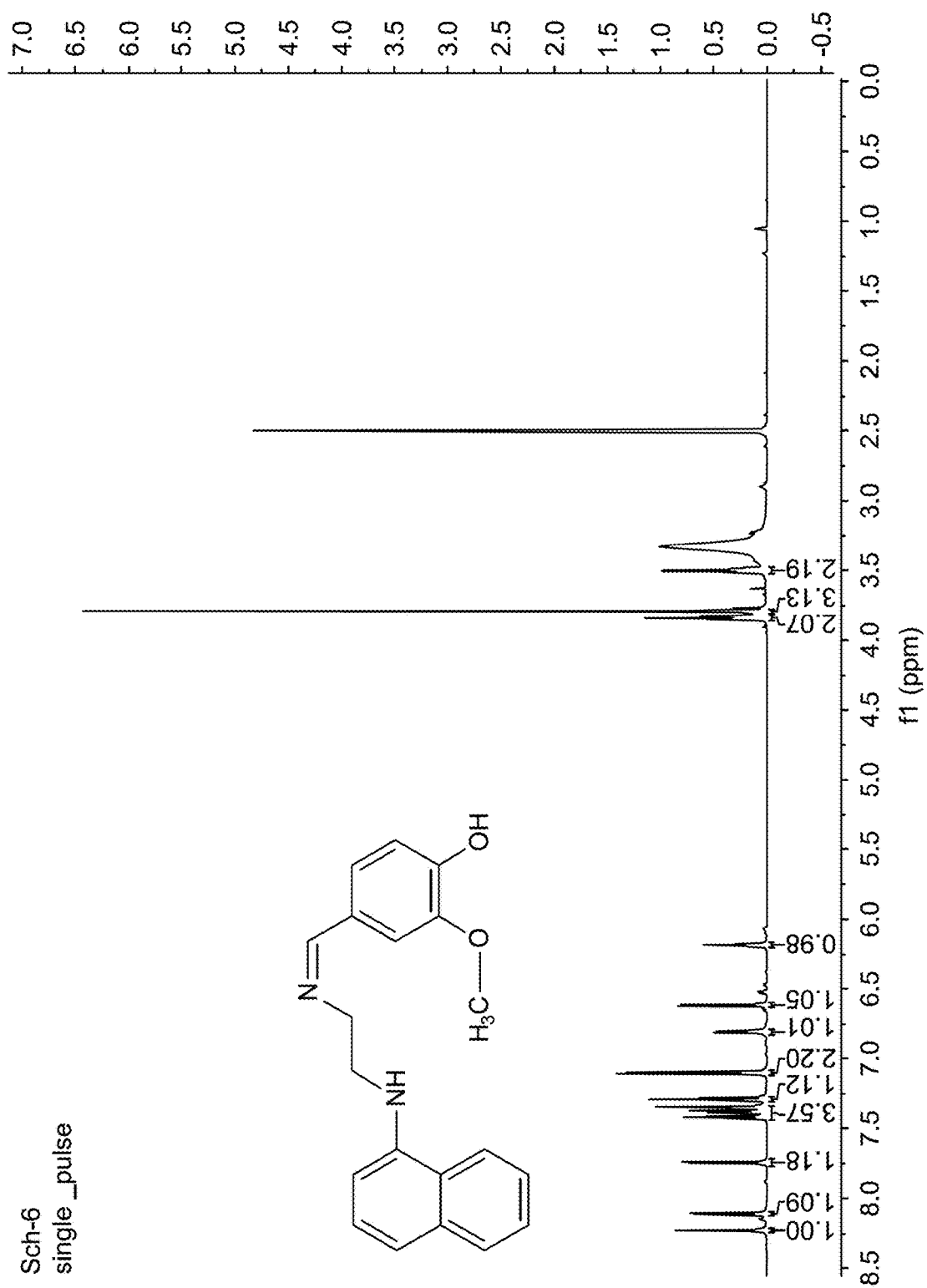
FIG. 5B is a $^1$H NMR spectrum of compound S3, according to certain embodiments.
Figure 5C:
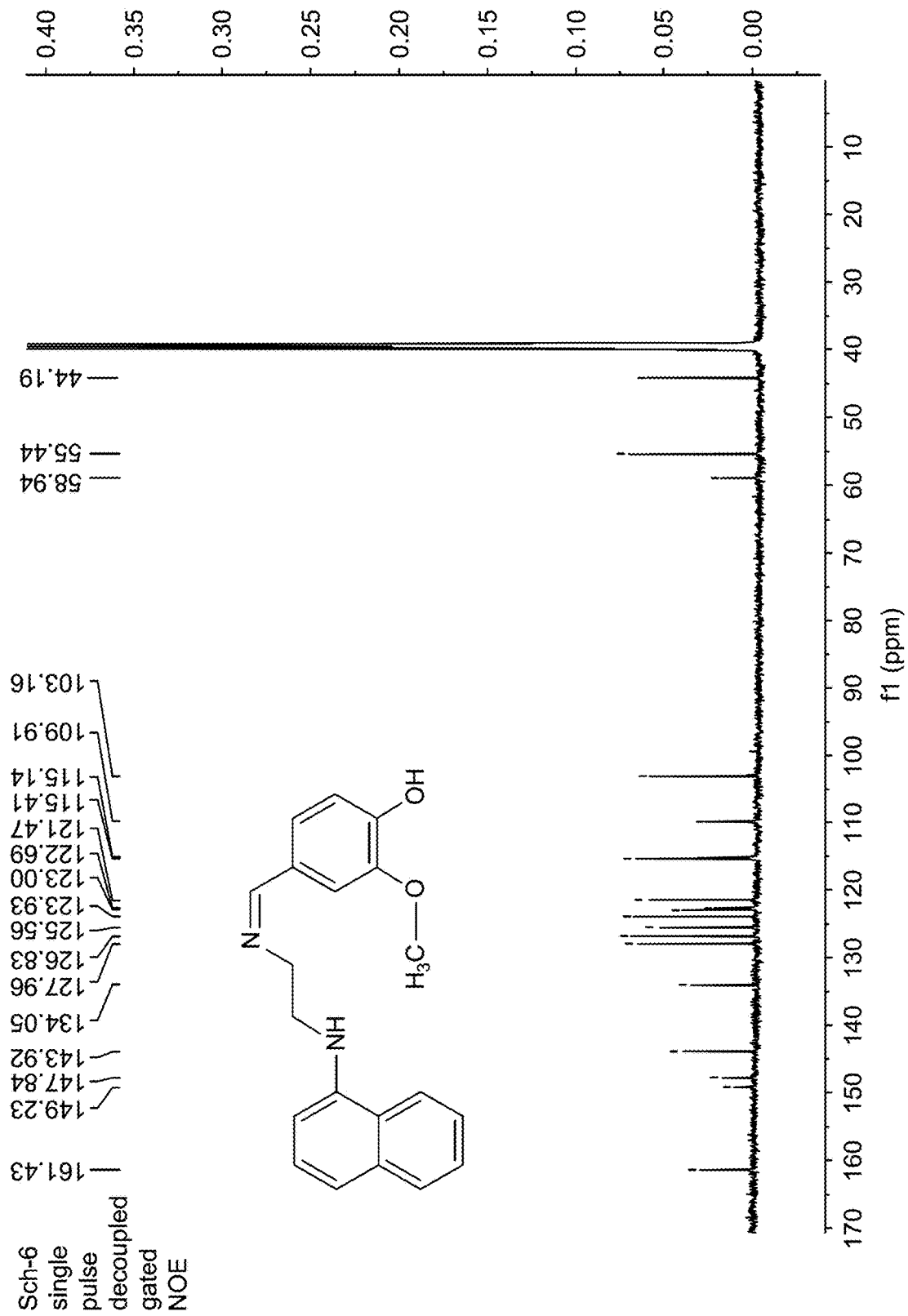
FIG. 5C is a $^{13}$C NMR spectrum of compound S3, according to certain embodiments.

Compound S3: The formed precipitate was recrystallized from 50% ethanol to give the target compound as brown solid, yielding 0.217 g, corresponding to a 68% yield. FT-IR ($v$, $cm^{-1}$); 3291 (N—H str), 3380(0-H str), 3047 ($sp^2$=CH str), 2836 ($sp^3$-CH str), 1645 (C=N str), 1576 (C=C str), 1120 (C-0 str), 1025 (C—N str) [as shown in FIG. 5A]. $^1$H NMR (600 MHz, DMSO-d6) δ 8.23 (s, $^1$H), 8.11 (d, J=8.4 Hz, $^1$H), 7.74 (d, J=8.1 Hz, $^1$H), 7.44-7.34 (m, $^3$H), 7.29 (dd, J=12.8, 4.9 Hz, $^1$H), 7.10 (d, J=8.0 Hz, $^2$H), 6.81 (d, J=7.9 Hz, $^1$H), 6.61 (d, J=7.6 Hz, $^1$H), 6.19 (t, J=5.5 Hz, $^1$H), 3.84 (t, J=6.4 Hz, $^2$H), 3.79 (s, $^3$H), 3.50 (dd, J=12.3, 6.3 Hz, $^2$H) [as shown in FIG. 5B]. 13C NMR (151 MHz, DMSO-d6) δ 161.4, 149.2, 147.8, 143.9, 134.0, 127.9, 126.8, 125.5, 123.9, 123.0, 122.6, 121.4, 115.4, 115.1, 109.9, 103.1, 58.9, 55.4, 44.1. HRMS m/z (ASAP) [M+H]$^+$ 321.1596 (requires 321.1603 for $C_{20}H_{21}N_2O_2$) [as shown in FIG. 5C].

Figure 6A:
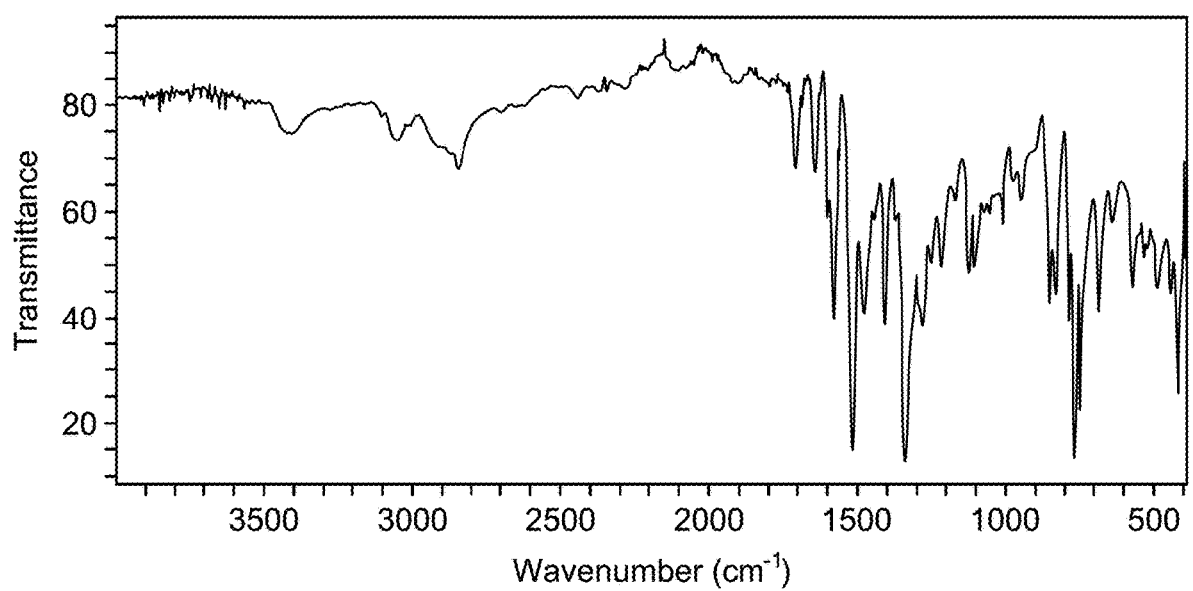
FIG. 6A shows a FT-IR spectrum of S4, according to certain embodiments.
Figure 6B:
FIG. 6B is a $^1$H NMR spectrum of compound S4, according to certain embodiments.
Figure 6C:
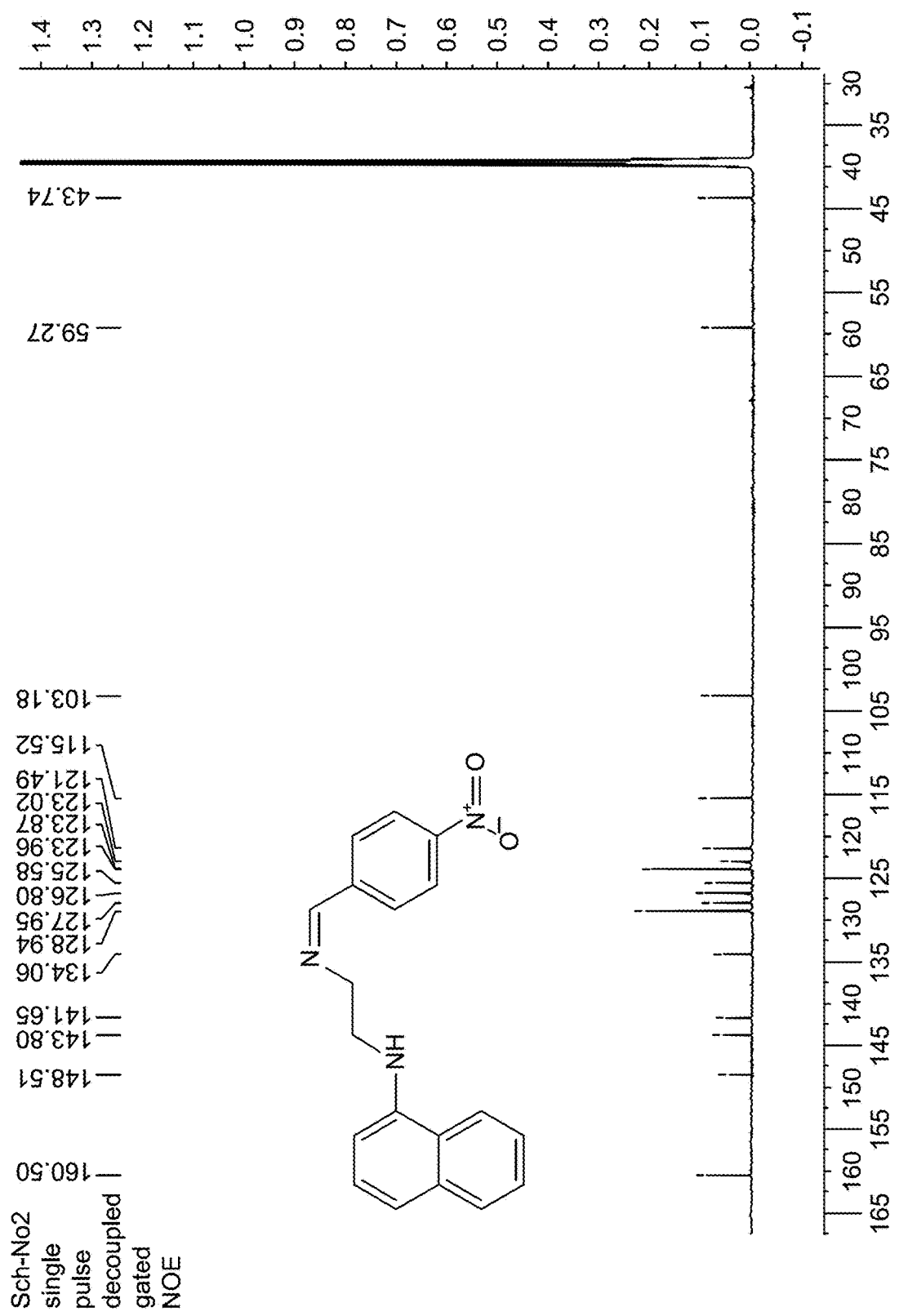
FIG. 6C is a $^{13}$C NMR spectrum of compound S4, according to certain embodiments.

Compound S4: The solvent was removed to produce an orange oily compound, yielding 0.184 g, corresponding to a 75% yield. FT-IR ($v$, $cm^{-1}$); 3421 (N—H str), 3048 ($sp^2$=CH str), 2845 ($sp^3$-CH str), 1641 (C=N str), 1580 (C=C str), 1515 & 1339 ($NO_2$ str), 1125 (C—N str) [as shown in FIG. 6A]. $^1$H NMR (600 MHz, DMSO-d6) δ 8.53 (s, $^1$H), 8.31-8.28 (m, $^2$H), 8.11 (d, J=8.4 Hz, 1H), 8.02-7.98 (m, $^2$H), 7.76-7.73 (m, $^1$H), 7.43-7.35 (m, $^2$H), 7.29 (t, J=7.9 Hz, $^1$H), 7.11 (d, J=8.1 Hz, $^1$H), 6.63 (d, J=7.6 Hz, $^1$H), 6.24 (t, J=5.6 Hz, $^1$H), 3.98 (t, J=6.0 Hz, $^2$H), 3.58 (q, J=6.2 Hz, $^2$H) [as shown in FIG. 6B]. $^{13}$C NMR (151 MHz, DMSO-d6) δ 160.50, 148.51, 143.80, 141.65, 134.06, 128.94, 127.95, 126.80, 125.58, 123.96, 123.87, 123.02, 121.49, 115.52, 103.18, 59.27, 43.74 [as shown in FIG. 6C]. HRMS m/z (ASAP) [M+H]$^+$ 320.1390 (requires 320.1399 for $C_{19}H_{18}N_3O_2$).

Figure 7A:
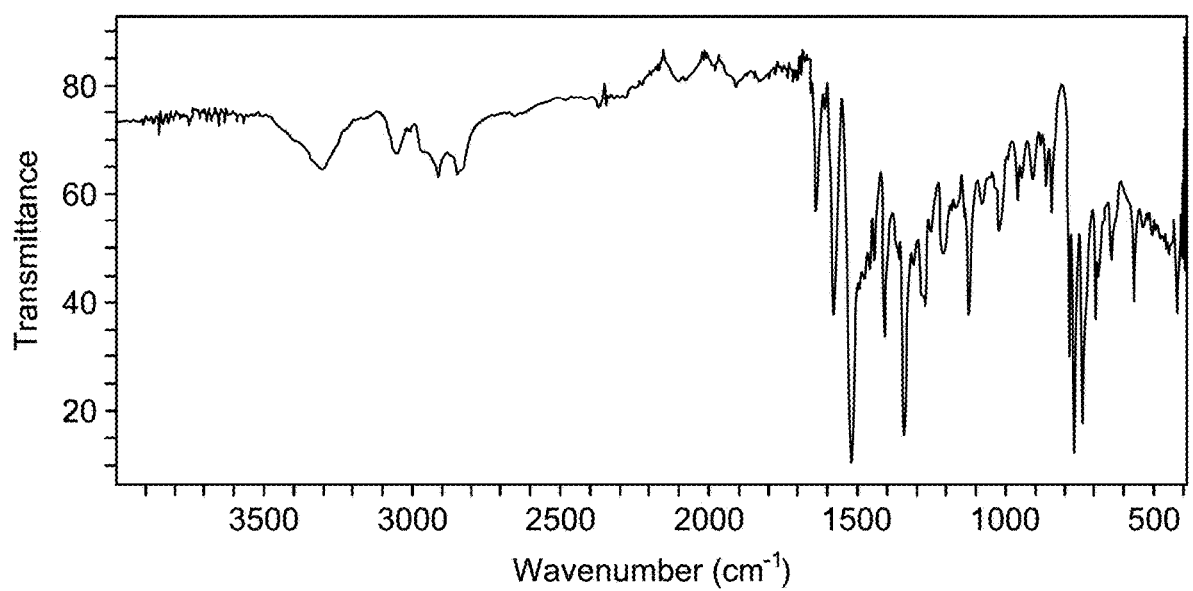
FIG. 7A FT-IR spectrum of S5, according to certain embodiments.
Figure 7B:
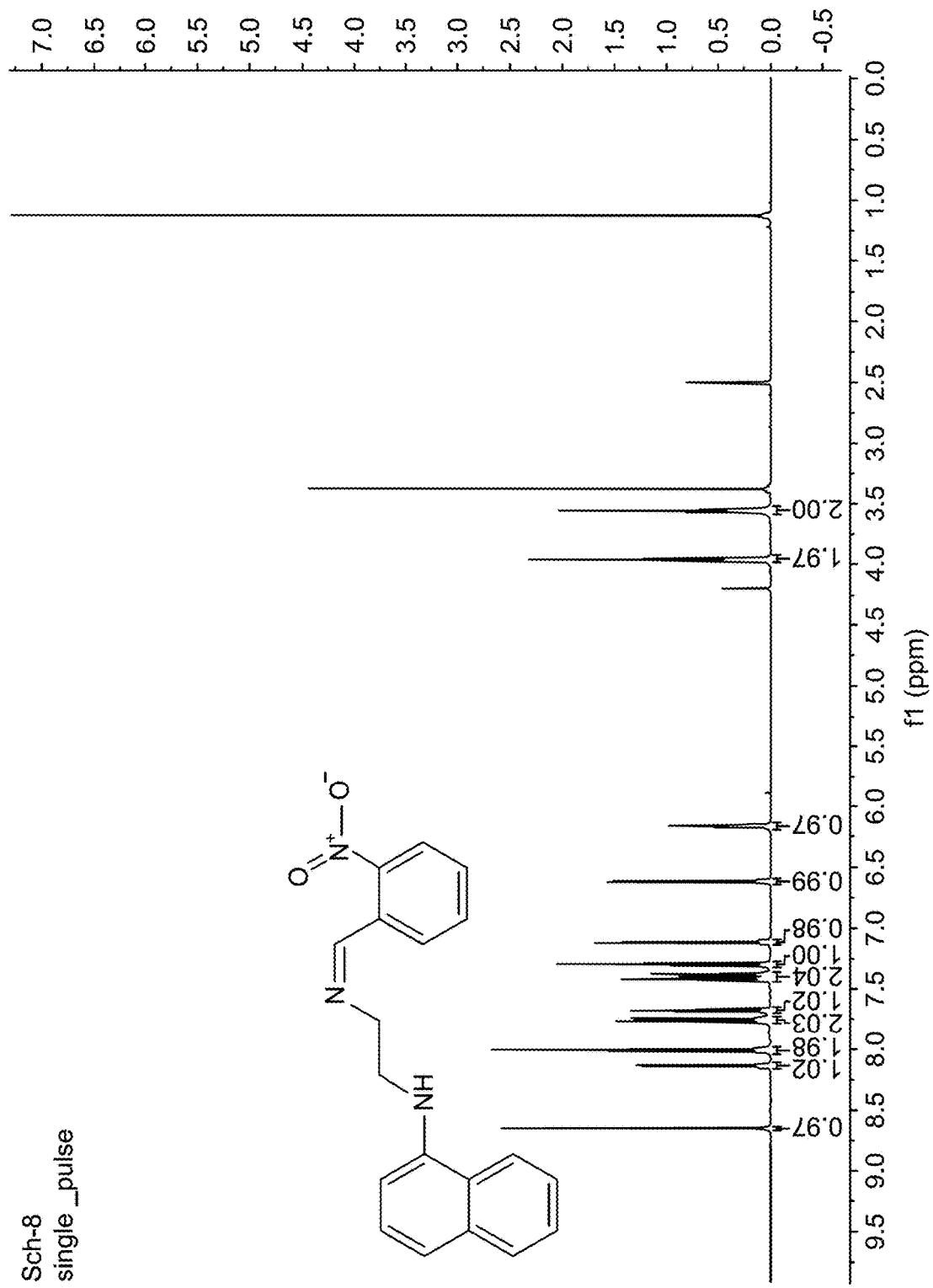
FIG. 7B is a $^1$H NMR spectrum of compound S5, according to certain embodiments.
Figure 7C:
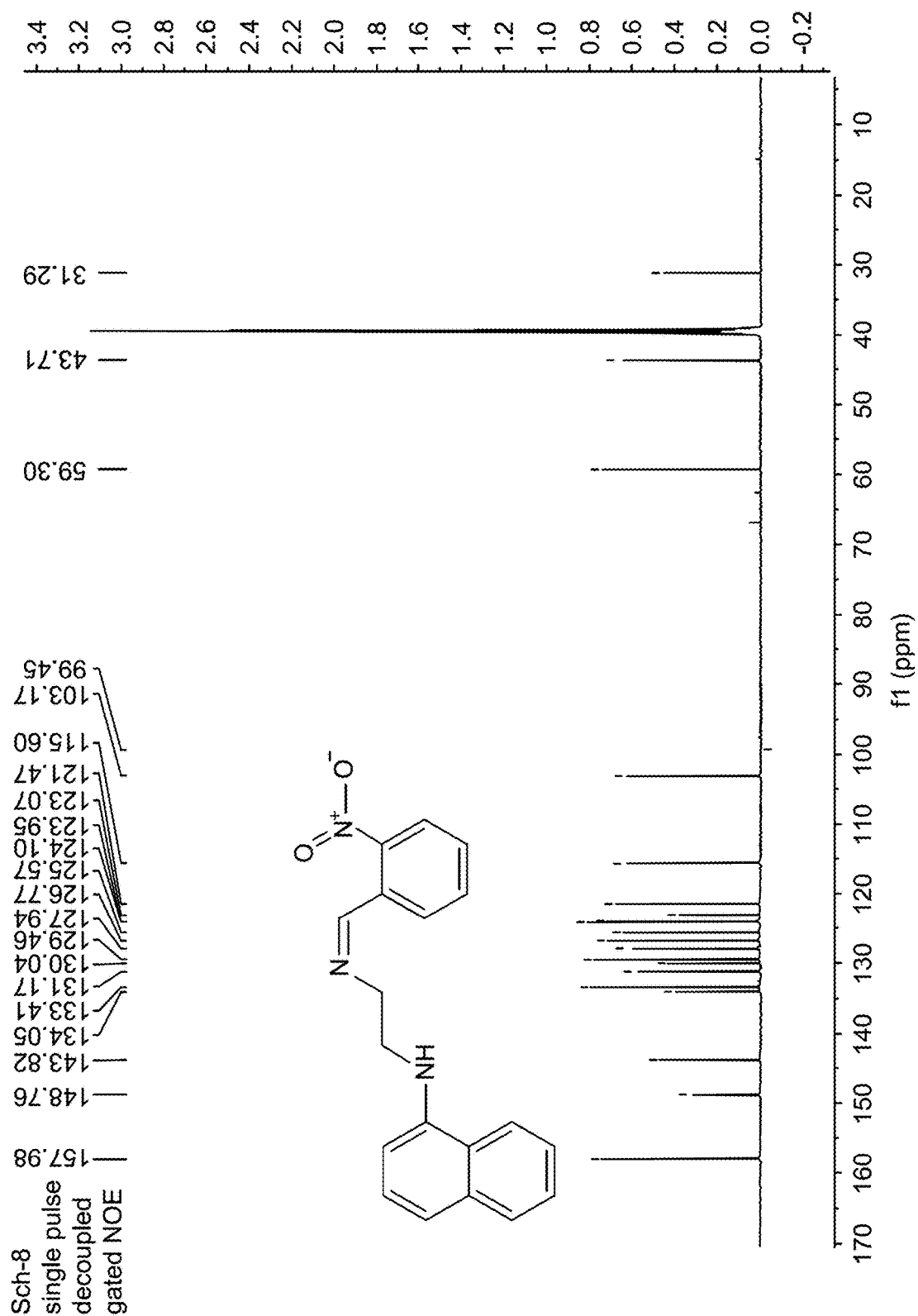
FIG. 7C is a $^{13}$C NMR spectrum of compound S5, according to certain embodiments.

Compound S5: The solvent was removed to yield an orange oil, yielding 0.278 g, corresponding to a 93% yield. FT-IR ($v$, $cm^{-1}$); 3306 (N—H str), 3056 ($sp^2$=CH str), 2912 ($sp^3$-CH str), 1634 (C=N str), 1578 (C=C str), 1518 & 1342 ($NO_2$ str), 1125 (C—N str) [as shown in FIG. 7A]. $^1$H NMR (600 megahertz (MHz), DMSO-d6) δ 8.65 (s, $^1$H), 8.14 (d, J=8.3 Hz, $^1$H), 8.01 (t, J=8.1 Hz, $^2$H), 7.76 (dd, J=18.3, 7.8 Hz, $^2$H), 7.68 (td, J=8.0, 1.3 Hz, $^1$H), 7.44-7.36 (m, $^2$H), 7.30 (t, J=7.9 Hz, $^1$H), 7.12 (d, J=8.1 Hz, $^1$H), 6.62 (d, J=7.6 Hz, $^1$H), 6.16 (t, J=5.5 Hz, $^1$H), 3.96 (t, J=6.1 Hz, $^2$H), 3.58-3.52 (m, $^2$H) [as shown in FIG. 7B]. $^{13}$C NMR (151 MHz, DMSO-d6) δ 157.9, 148.7, 143.8, 134.0, 133.4, 131.1, 130.0, 129.4, 127.9, 126.7, 125.5, 124.1, 123.9, 123.0, 121.4, 115.6, 103.1, 99.4, 59.3, 43.7, 31.2 [as shown in FIG. 7C]. HRMS m/z (ASAP) [M+H]$^+$ 321.1596 (requires 321.1306 for $C_{20}H_{21}N_2O_2$).

Figure 8A:
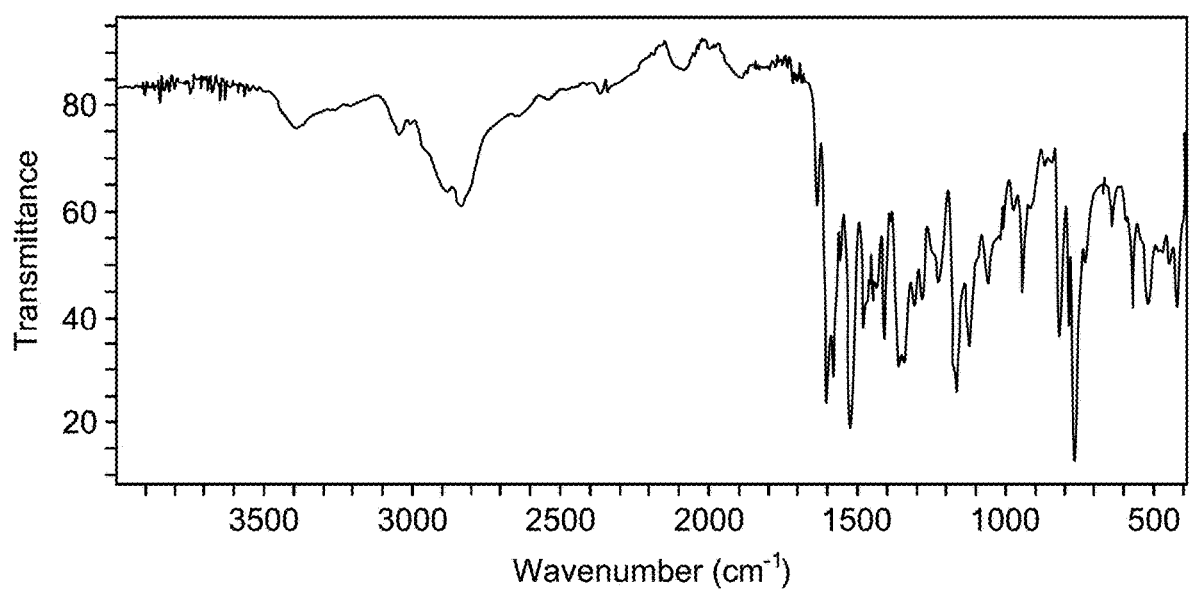
FIG. 8A shows a FT-IR spectrum of S6, according to certain embodiments.
Figure 8B:
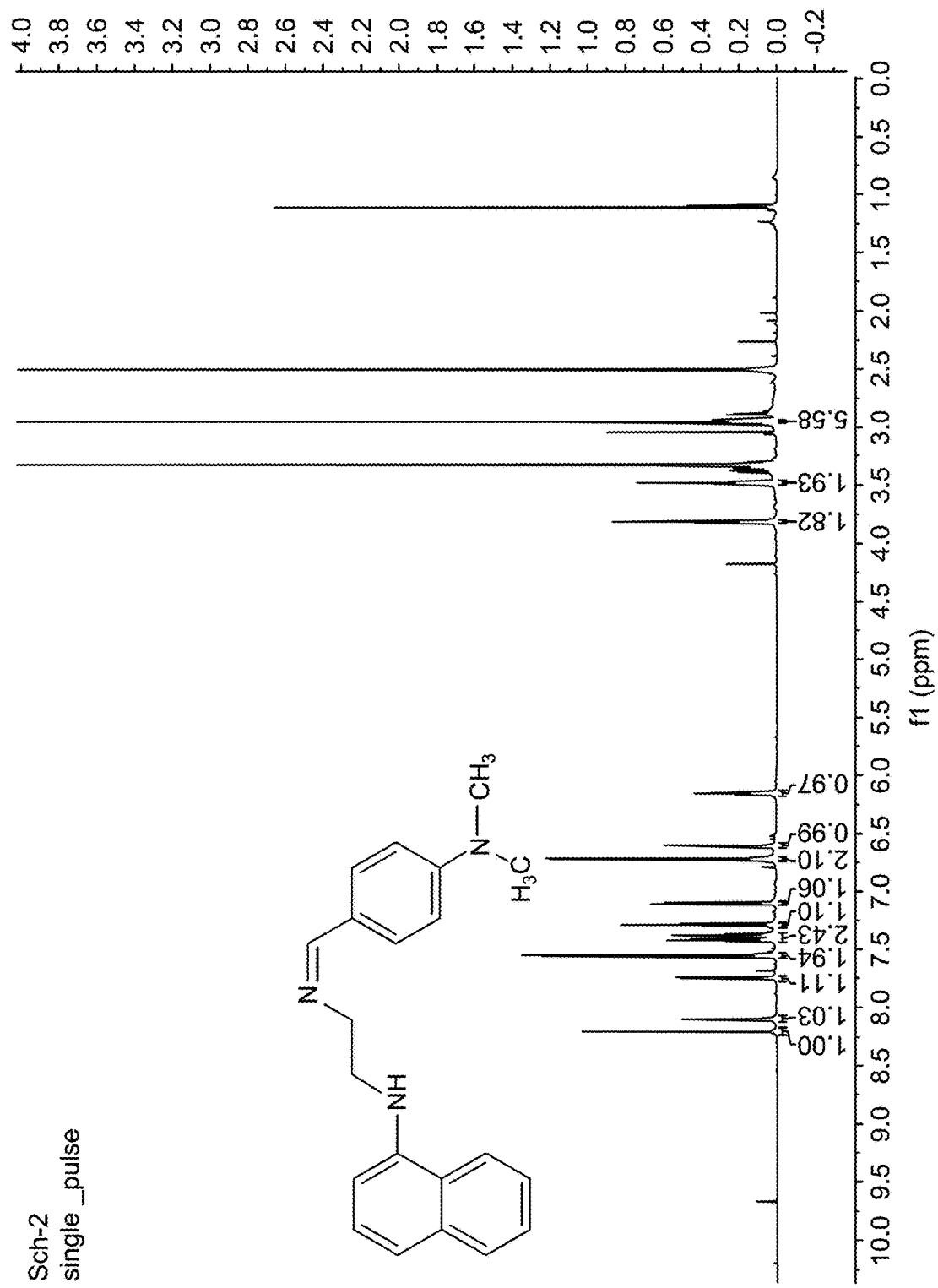
FIG. 8B is a $^1$H NMR spectrum of compound S6, according to certain embodiments.

Compound S6: The solvent was removed to yield an orange oily compound, yielding 0.24 g, corresponding to a 76% yield. FT-IR ($v$, $cm^{-1}$); 3393 (N—H str), 3048 ($sp^2$=CH str), 2834 ($sp^3$-CH str), 1632 (C=N str), 1576 (C=C str), 1162 (C—N str) [as shown in FIG. 8A]. $^1$H NMR (600 MHz, DMSO-d6) δ 8.21 (s, $^1$H), 8.10 (d, J=8.3 Hz, $^1$H), 7.74 (d, J=7.6 Hz, $^1$H), 7.55 (t, J=5.7 Hz, $^2$H), 7.44-7.35 (m, $^2$H), 7.29 (t, J=7.9 Hz, $^1$H), 7.10 (d, J=8.1 Hz, $^1$H), 6.74-6.70 (m, $^2$H), 6.61 (d, J=7.6 Hz, $^1$H), 6.16 (t, J=5.5 Hz, $^1$H), 3.82 (t, J=6.4 Hz, $^2$H), 3.48 (dd, J=12.4, 6.4 Hz, $^2$H), 2.96 (s, $^6$H) [as shown in FIG. 8B]. $^{13}$C NMR (151 MHz, DMSO-d6) δ

Figure 8C:
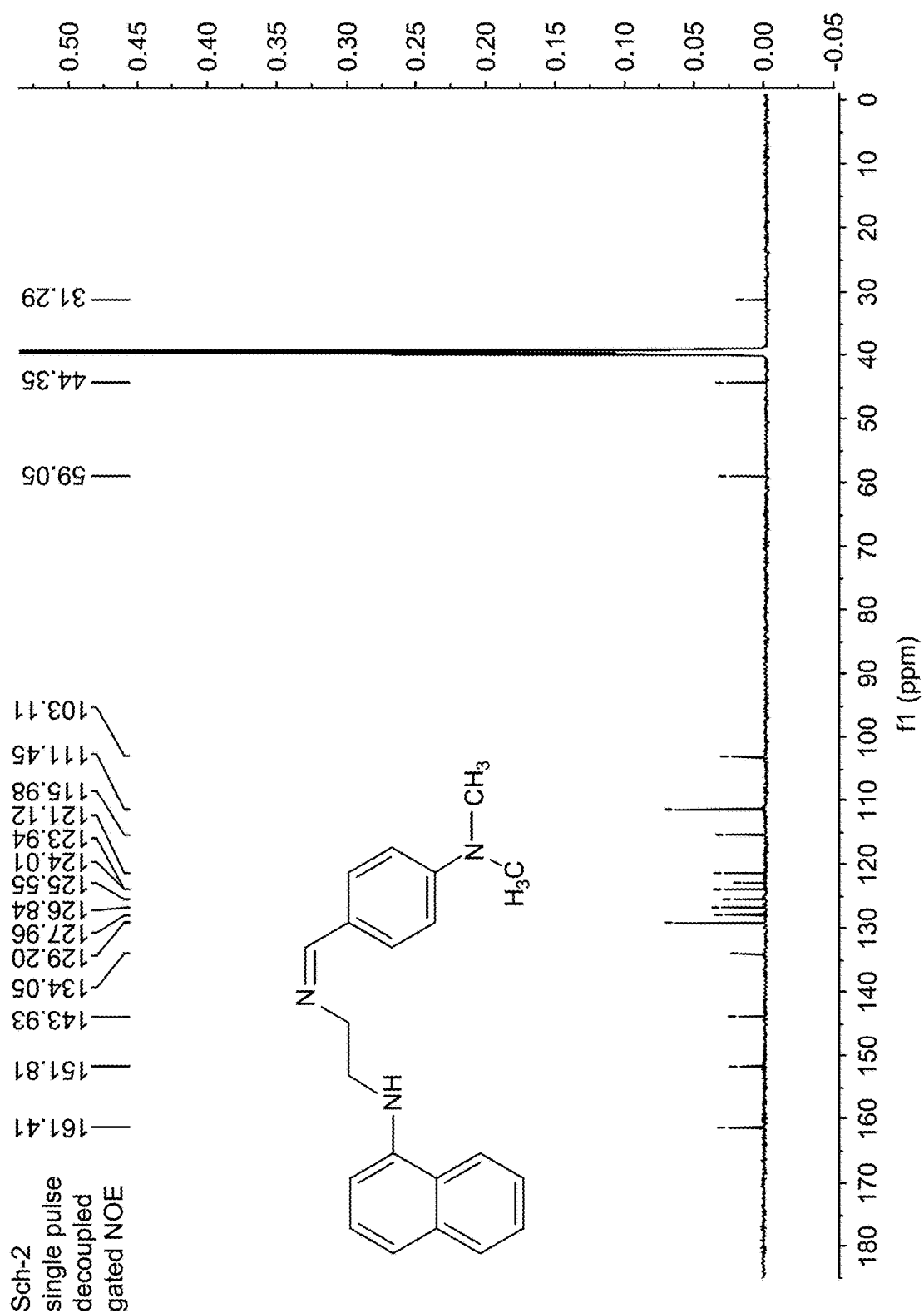
FIG. 8C is a $^{13}$C NMR spectrum of compound S6, according to certain embodiments.

161.4, 151.8, 143.9, 134.0, 129.2, 127.9, 126.8, 125.5, 124.0, 123.9, 122.9, 121.4, 115.3, 111.4, 103.1, 59.0, 44.3, 31.2 [as shown in FIG. 8C]. HRMS m/z (ASAP) [M+H]$^+$ 318.1963 (requires 318.1970 for $C_{21}H_{24}N_3$).

Figure 9A:
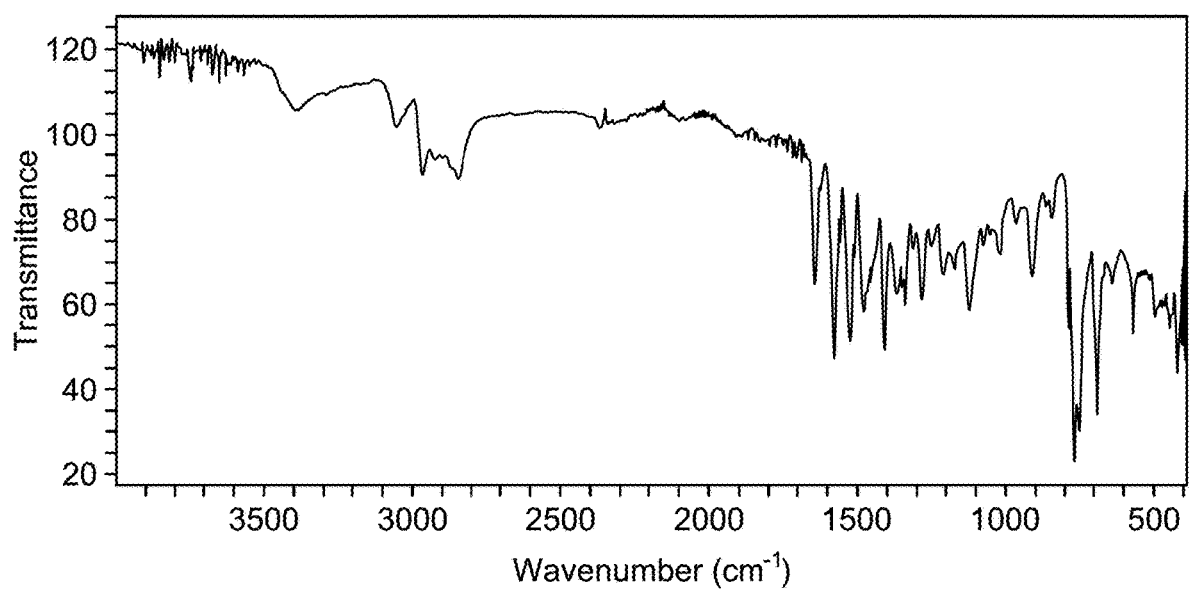
FIG. 9A shows a FT-IR spectrum of S7, according to certain embodiments.
Figure 9B:
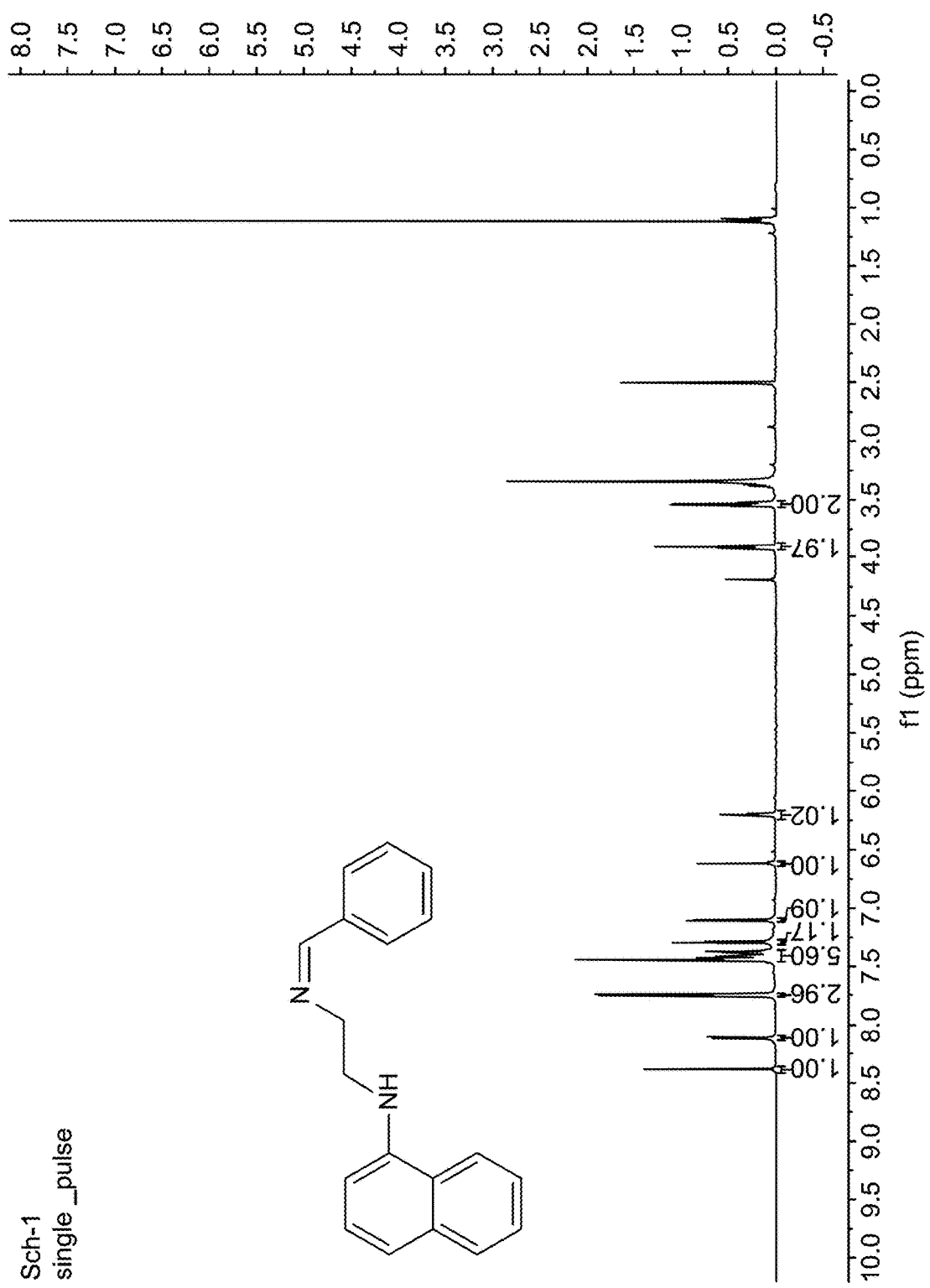
FIG. 9B is a $^1$H NMR spectrum of compound S7, according to certain embodiments.
Figure 9C:
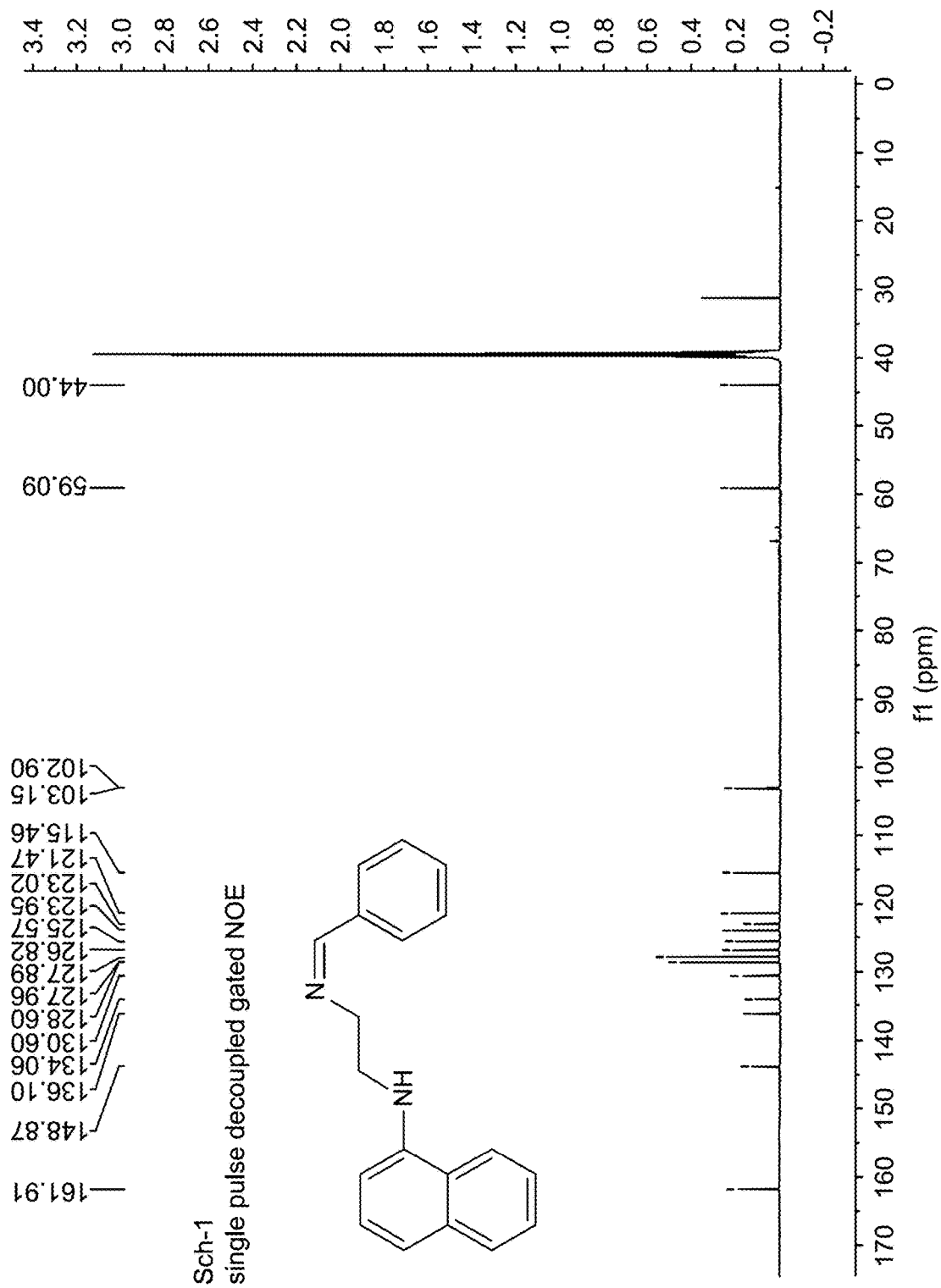
FIG. 9C is a $^{13}$C NMR spectrum of compound S7, according to certain embodiments.
Figure 10:
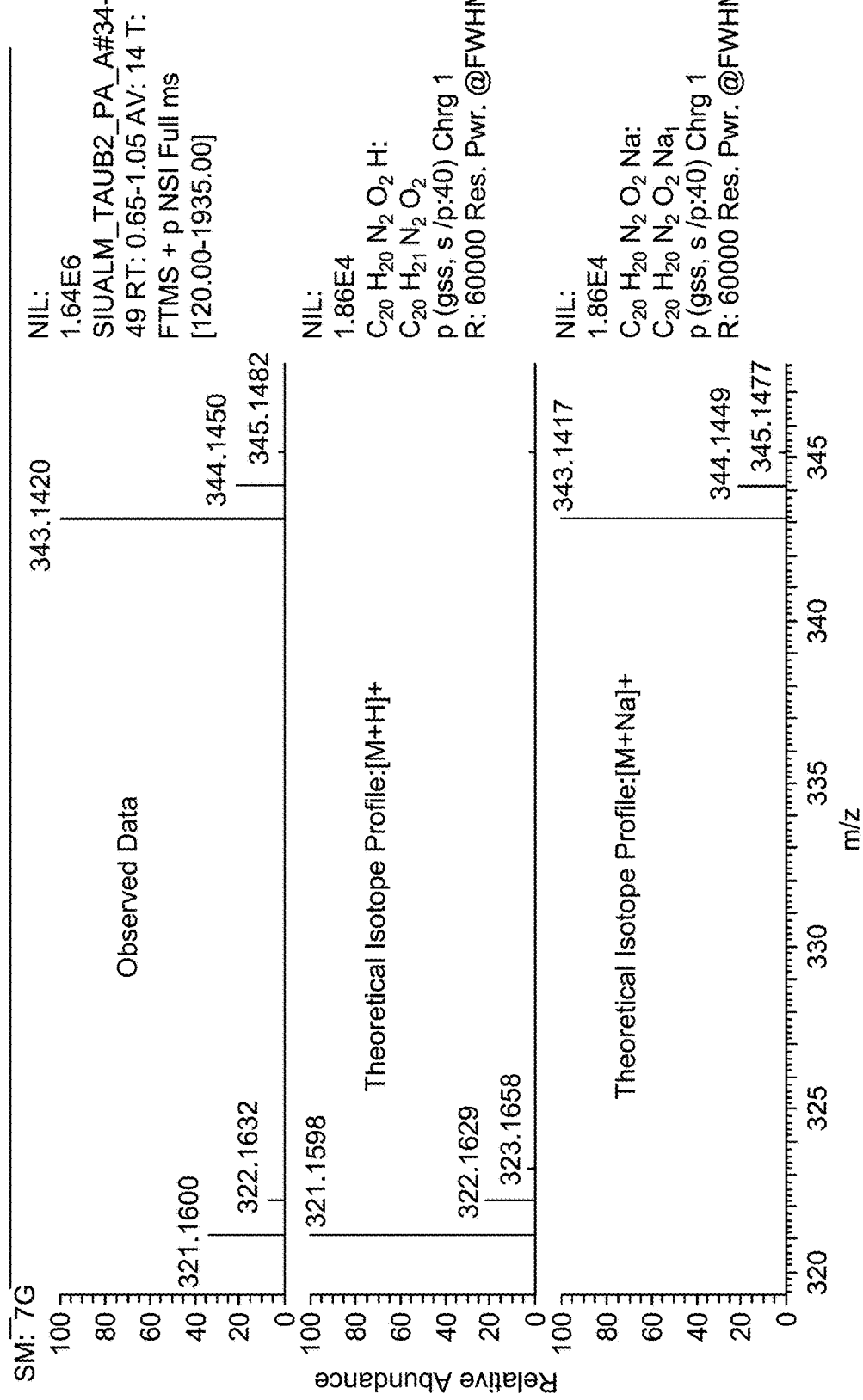
FIG. 10 shows mass spectra of compound S1, according to certain embodiments.
Figure 11:
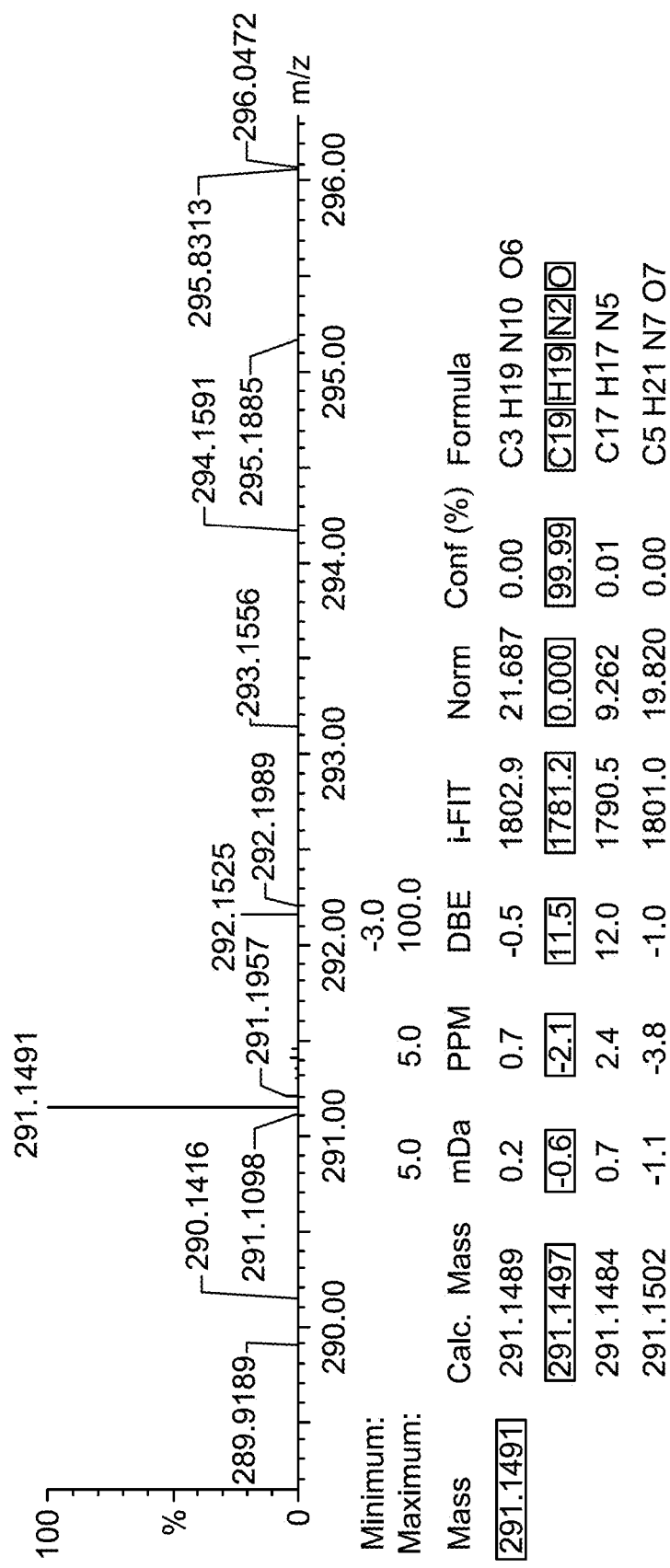
FIG. 11 shows mass spectra of compound S2, according to certain embodiments.
Figure 12:
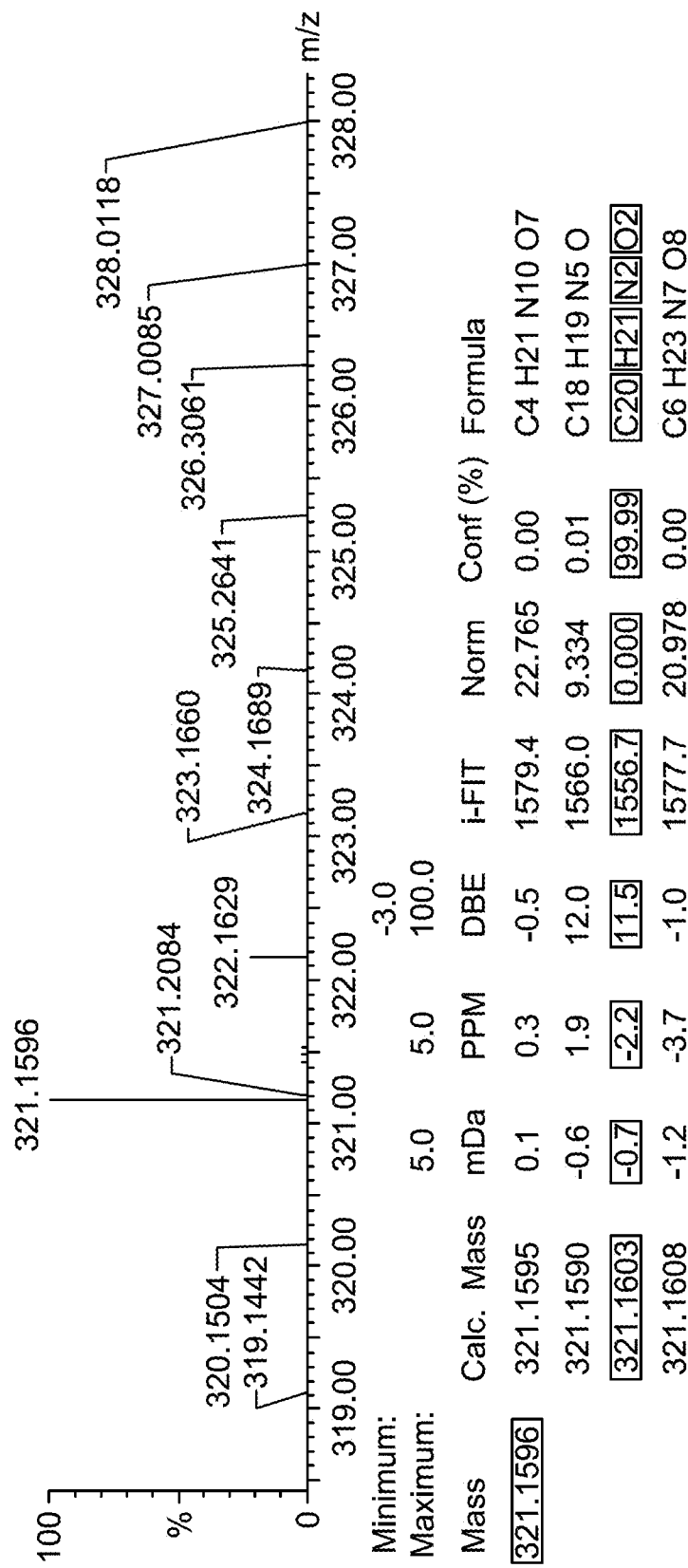
FIG. 12 shows mass spectra of compound S3, according to certain embodiments.
Figure 13:
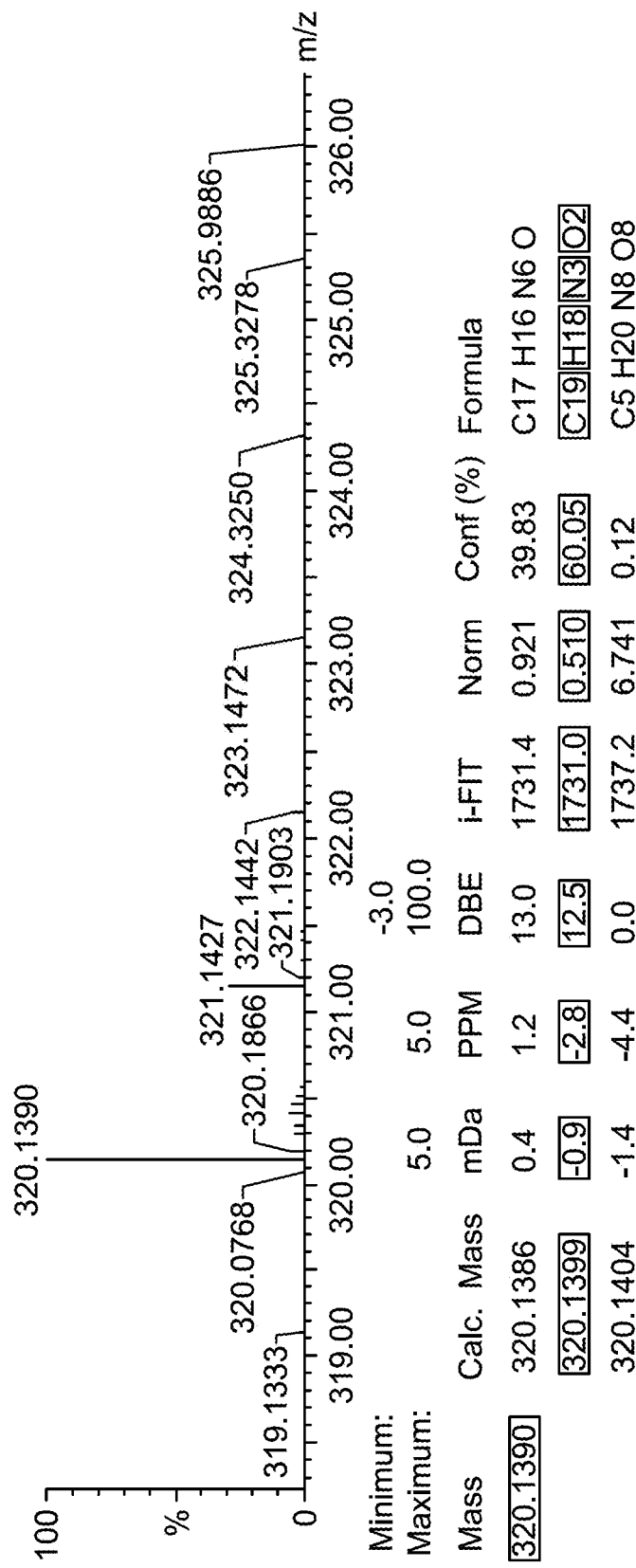
FIG. 13 shows mass spectra of compound S4, according to certain embodiments.
Figure 14:
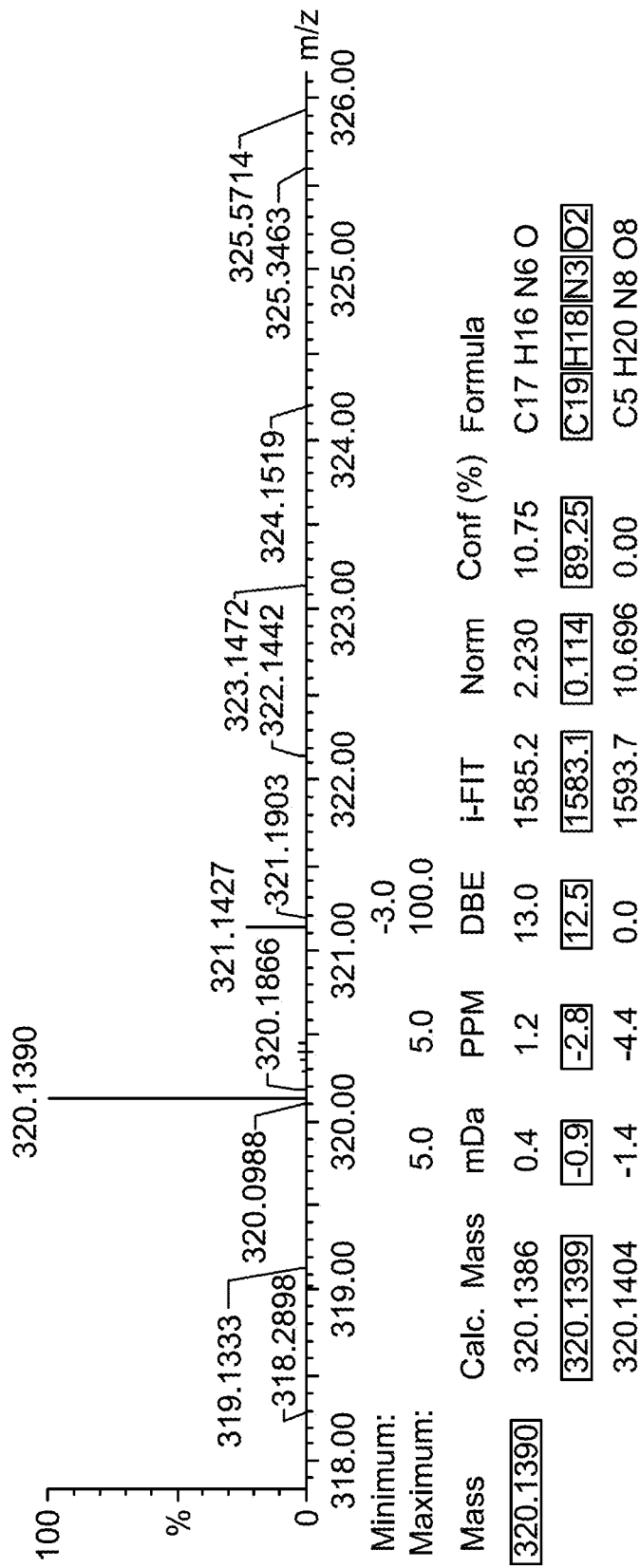
FIG. 14 shows mass spectra of compound S5, according to certain embodiments.
Figure 15:
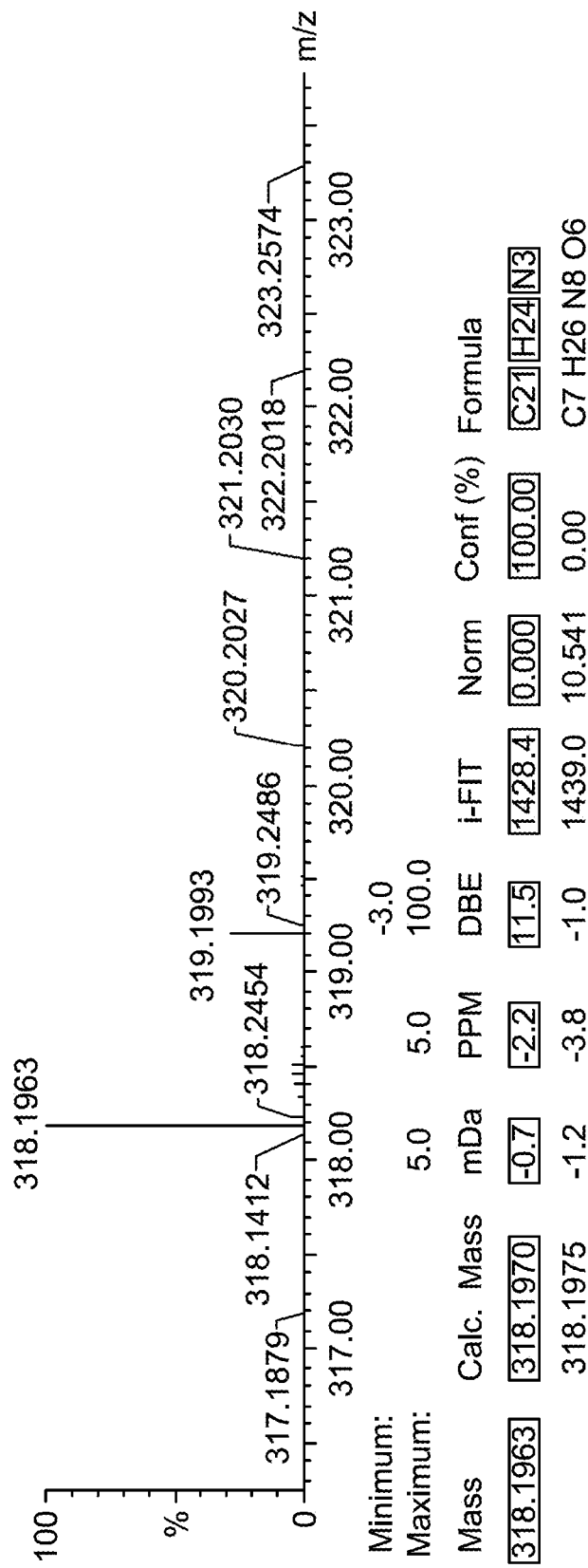
FIG. 15 shows mass spectra of compound S6, according to certain embodiments.
Figure 16:
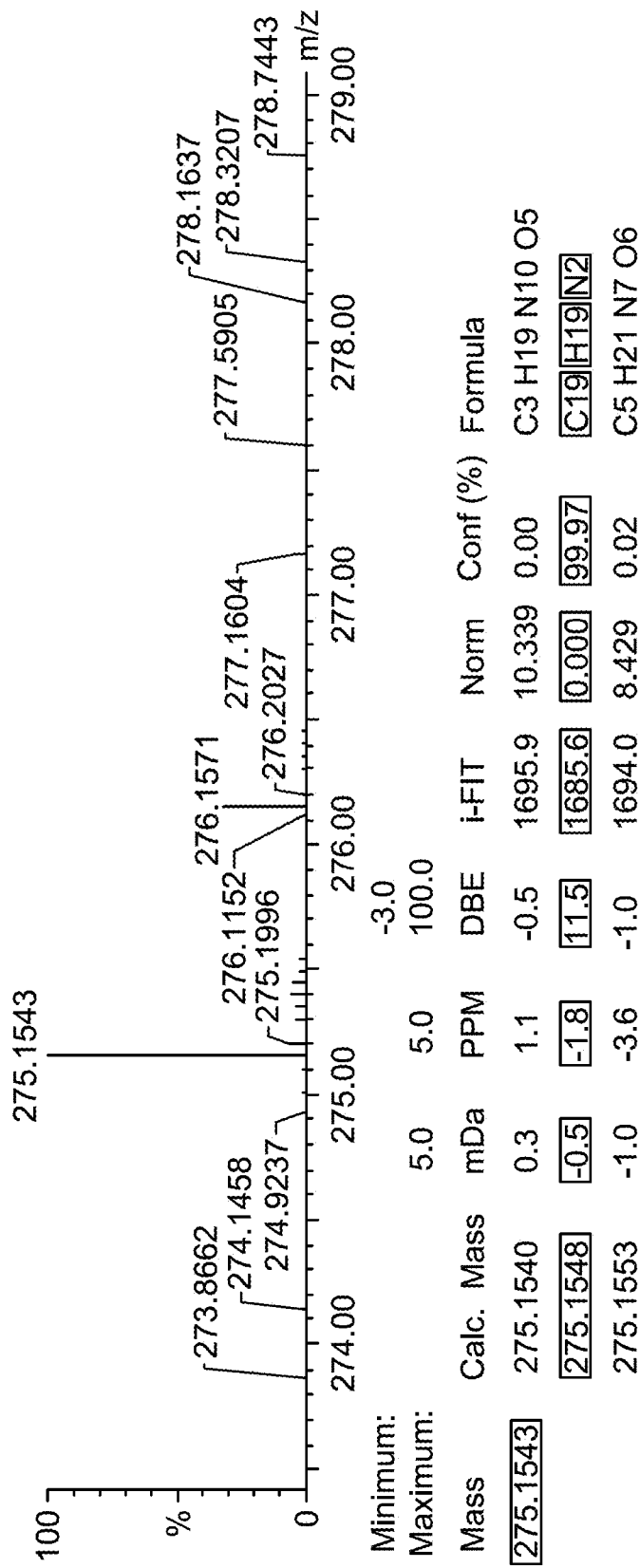
FIG. 16 shows mass spectra of compound S7, according to certain embodiments.

Compound S7: The solvent was removed to produce a brown oily compound, yielding 0.253 g, corresponding to a 98% yield. FT-IR (v, cm$^{-1}$); 3399 (N—H str), 2966 (sp$^2$=CH str), 2845 (sp$^3$-CH str), 1639 (C=N str), 1582 (C=C str), 1121 (C—N str) [as shown in FIG. 9A]. $^1$H NMR (600 MHz, DMSO-d6) δ 8.39 (s, $^1$H), 8.12 (d, J=8.4 Hz, $^1$H), 7.76-7.73 (m, $^3$H), 7.46-7.36 (m, $^6$H), 7.30 (dd, J=9.9, 5.8 Hz, $^1$H), 7.11 (d, J=8.1 Hz, $^1$H), 6.62 (d, J=7.6 Hz, $^1$H), 6.20 (t, J=5.5 Hz, $^1$H), 3.91 (dd, J=9.4, 3.5 Hz, $^2$H), 3.54 (q, J=6.3 Hz, $^2$H [as shown in FIG. 9B]. $^{13}$C NMR (151 MHz, DMSO-d6) δ 161.9, 143.8, 136.1, 134.0, 130.6, 128.6, 127.9, 127.8, 126.8, 125.5, 123.9, 123.0, 121.47, 115.4, 103.1, 102.9, 59.0, 44.0 [as shown in FIG. 9C]. HRMS m/z (ASAP) [M+H]$^+$ 275.1543 (requires 275.1548 for $C_{19}H_{19}N_2$).

Figure 17:
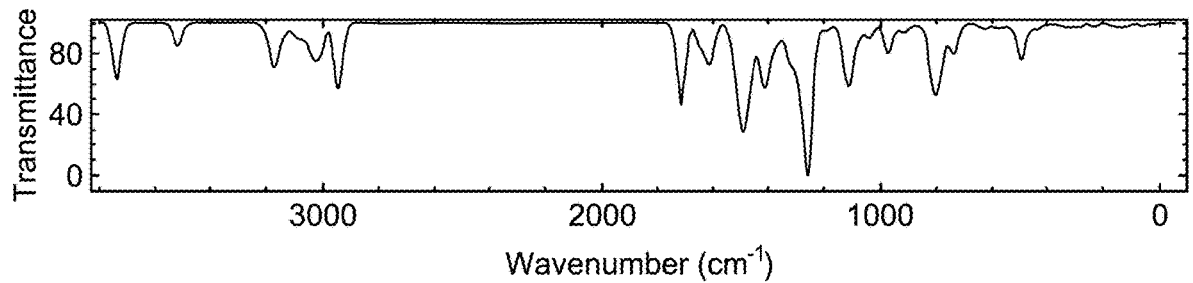
FIG. 17 depicts a density functional theory (DFT) predicted FT-IR spectrum for S1, according to certain embodiments.
Figure 18:
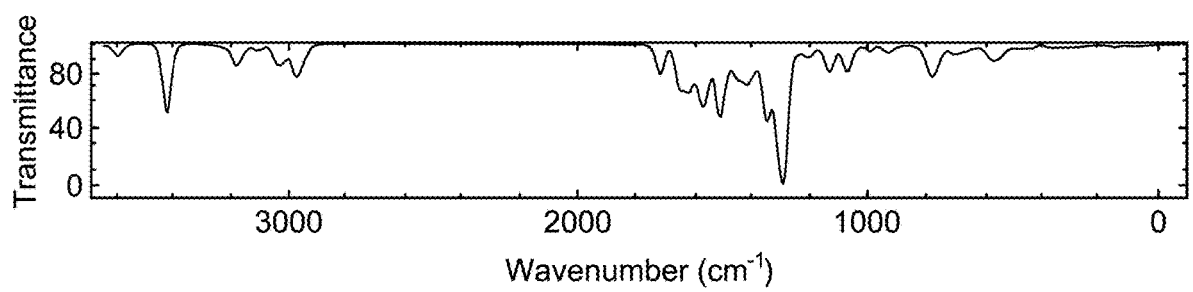
FIG. 18 depicts a DFT predicted FT-IR spectrum for S2, according to certain embodiments.

FT-IR spectra of the synthesized compounds, as shown in FIGS. 17-23, the presence of the characteristic medium stretch band at values over 3300 cm$^{-1}$ which was assigned to the secondary N—H group. The disappearance of the characteristic strong band of the carbonyl C=O group at 1674 cm$^{-1}$, along with the appearance of the medium stretch band of azomethane C=N around 1629 cm$^{-1}$ to 1645 cm$^{-1}$ confirms the formation of the target compounds. Although the O—H stretch band is appears as a significant broad band after 3000 cm$^{-1}$, it appeared here for S1, S2 and S3 as weak broad band around 3060 cm$^{-1}$ (~2900 cm$^{-1}$-2600 cm$^{-1}$ region) which can be attributed to the stretching vibration of the intramolecular hydrogen bonding of hydroxyl group to the azomethane unit (OH . . . N=C). The $^1$H NMR and $^{13}$C-NMR spectra of all the synthesized compounds reveals the characteristic singlet peak assigned for imine proton at δ 8.11 ppm, and its corresponding carbon appeared around 166 ppm thereby confirming the formation of the imine bond. This preparation method presents the advantage of one-step synthesis with water being the only by-product. The mass spectra for compounds S1-57 is shown in FIG. 10-FIG. 16. It confirmed their molecular structures, displaying molecular ion peaks consistent with their expected molecular weights. The presence of characteristic fragmentations further validated the proposed structures. To gain insight into the electronic structural properties of the previously reported compound A56 and the synthesized compounds, S1 and S2, density functional theory (DFT) calculations were performed, as shown in FIGS. 17-18, respectively.

Figure 19:
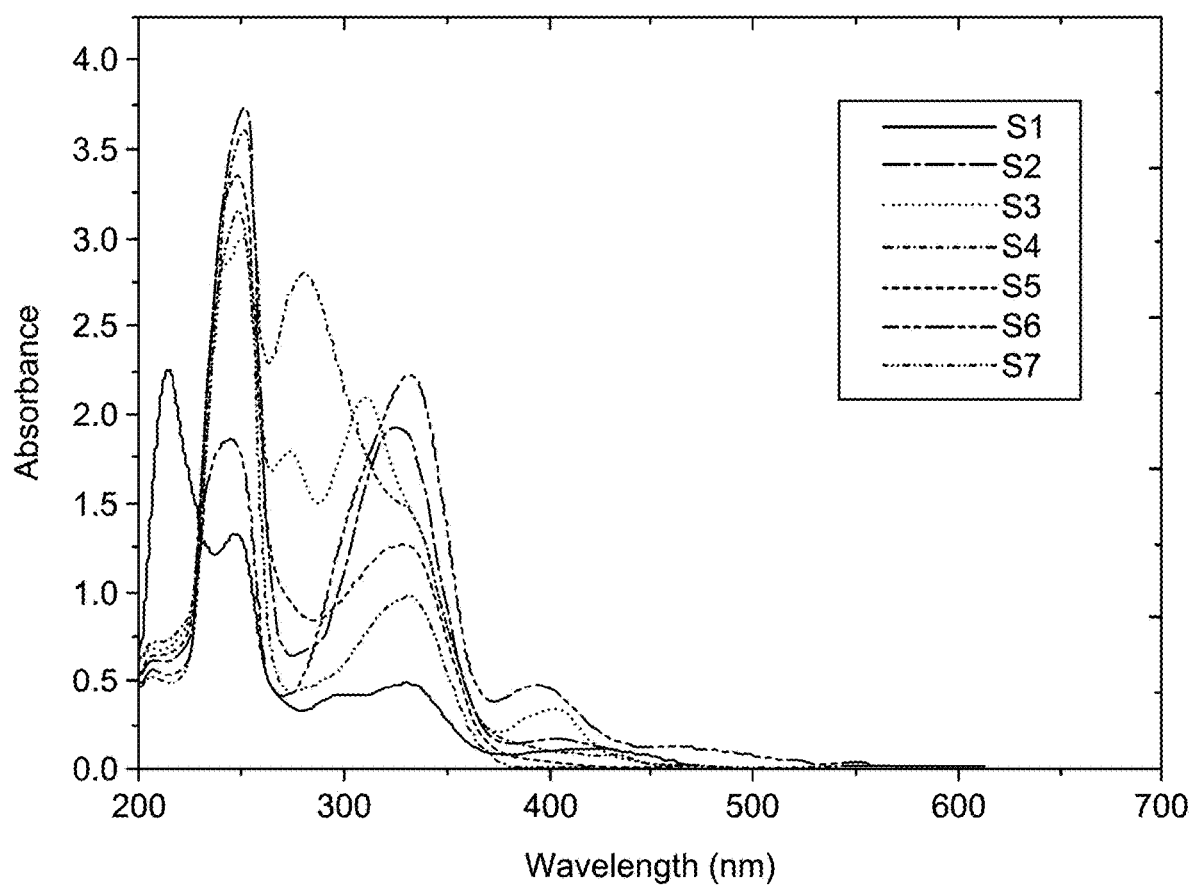
FIG. 19 UV-Vis absorption spectra of S1-S7 in 10 molar (M)-5 M ethyl alcohol (EtOH), according to certain embodiments.

Further, the optical properties of compounds S1-S7, and UV-vis absorption measurements (FIG. 19) were conducted in 10 molar (M) to 5 M EtOH solution, and the spectra showed a wide absorption band in the UV region from 200 nanometer (nm) to 385 nm with two maximum absorption peaks (λmax) at approximately ~200 nm and ~330 nm which were attributed to the (π-π*), (n-π*) transitions respectively, as shown in FIG. 19. The optical band gap ($E_{opt}$) that was calculated from wavelength onset (λonset) and the data, as listed in Table 1.

TABLE 1

UV-Vis data (λmax, λonset and $E_{opt}$) of compounds S1-S7.

| Compounds | λmax (nm) | λonset (nm) | $E_{opt}$ (eV) |
|---|---|---|---|
| S1 | 210-330 | 364 | 3.4 |
| S2 | 252-326 | 447 | 2.77 |
| S3 | 250-311 | 431 | 2.88 |
| S4 | 251-282 | 370 | 3.35 |
| S5 | 248-330 | 375 | 3.31 |
| S6 | 245-332 | 433 | 2.86 |
| S7 | 249-332 | 374 | 3.32 |

Figure 20:
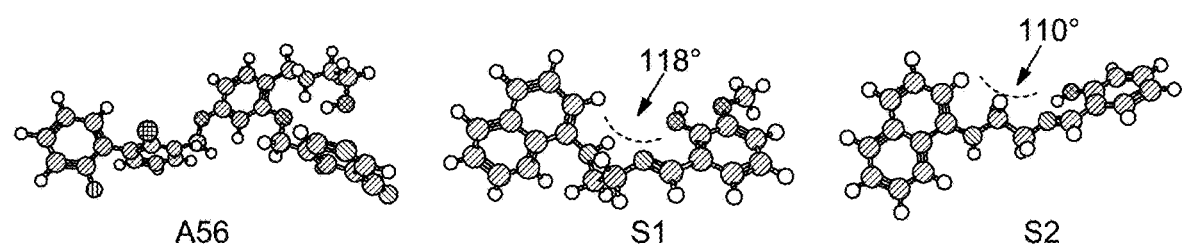
FIG. 20 illustrates optimized ground state geometries of A56, S1 and S2, according to certain embodiments.
Figure 21:
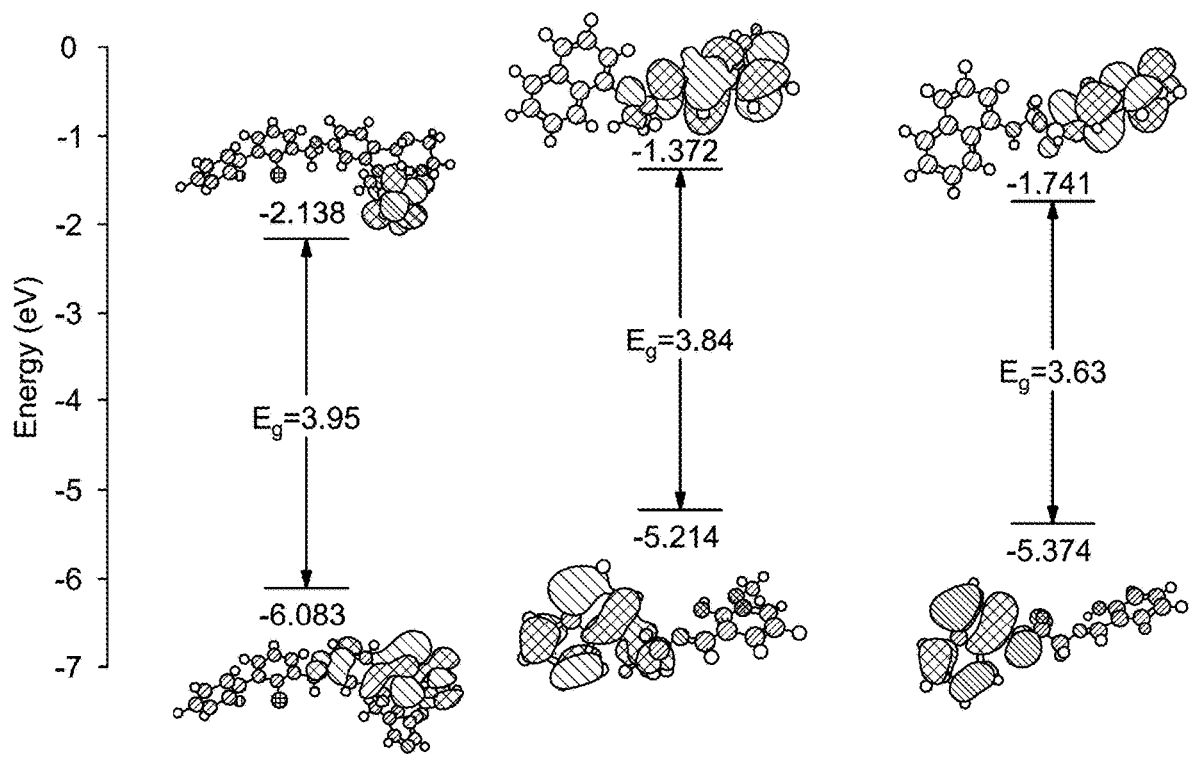
FIG. 21 illustrates the highest occupied molecular orbital (HOMO), the lowest unoccupied molecular orbital (LUMO) maps and energy gaps (Eg) of A56, S1 and S2, according to certain embodiments.
Figure 22:
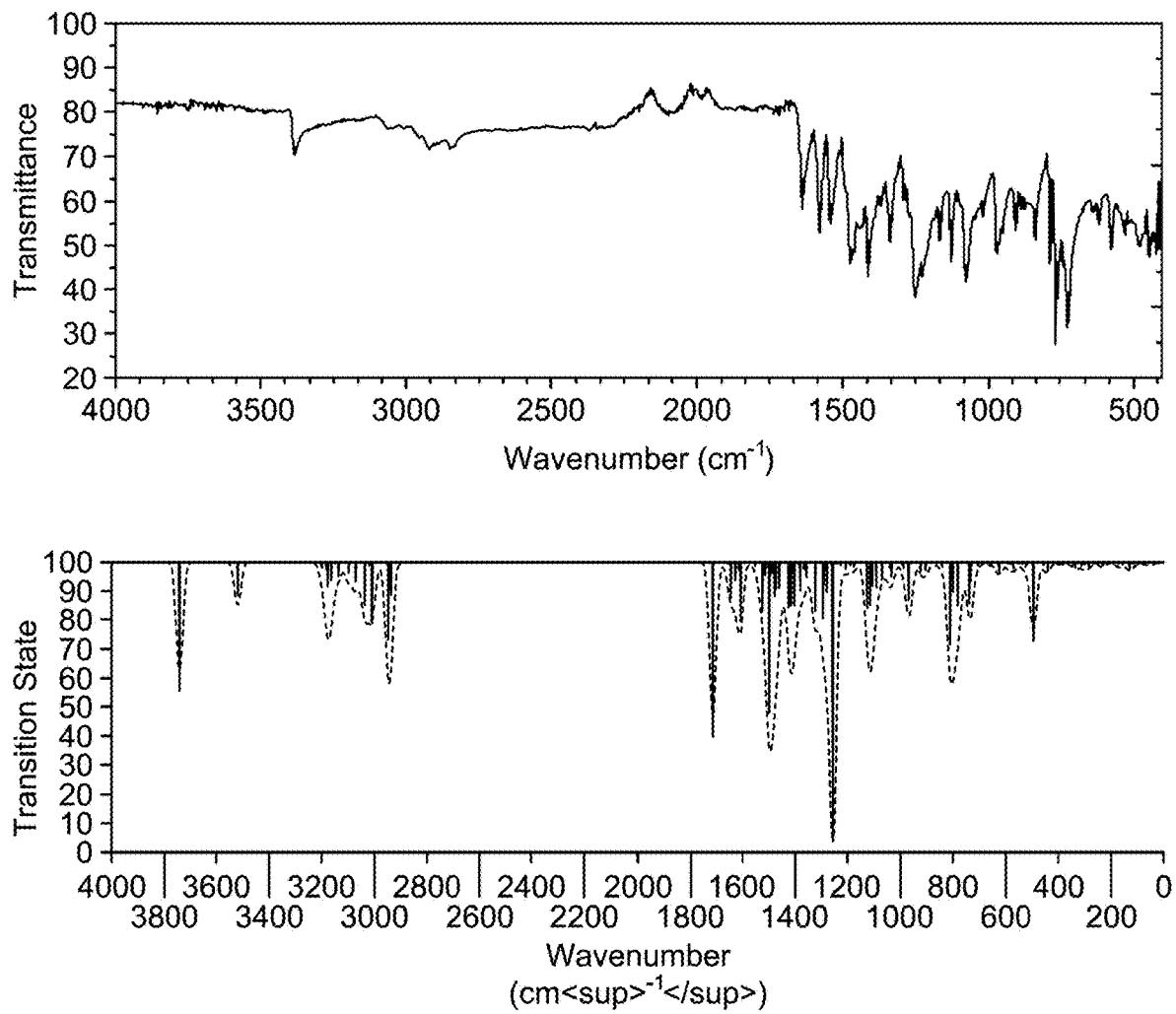
FIG. 22 shows a comparison of experimental and DFT predicted FT-IR spectra of S1, according to certain embodiments.
Figure 23:
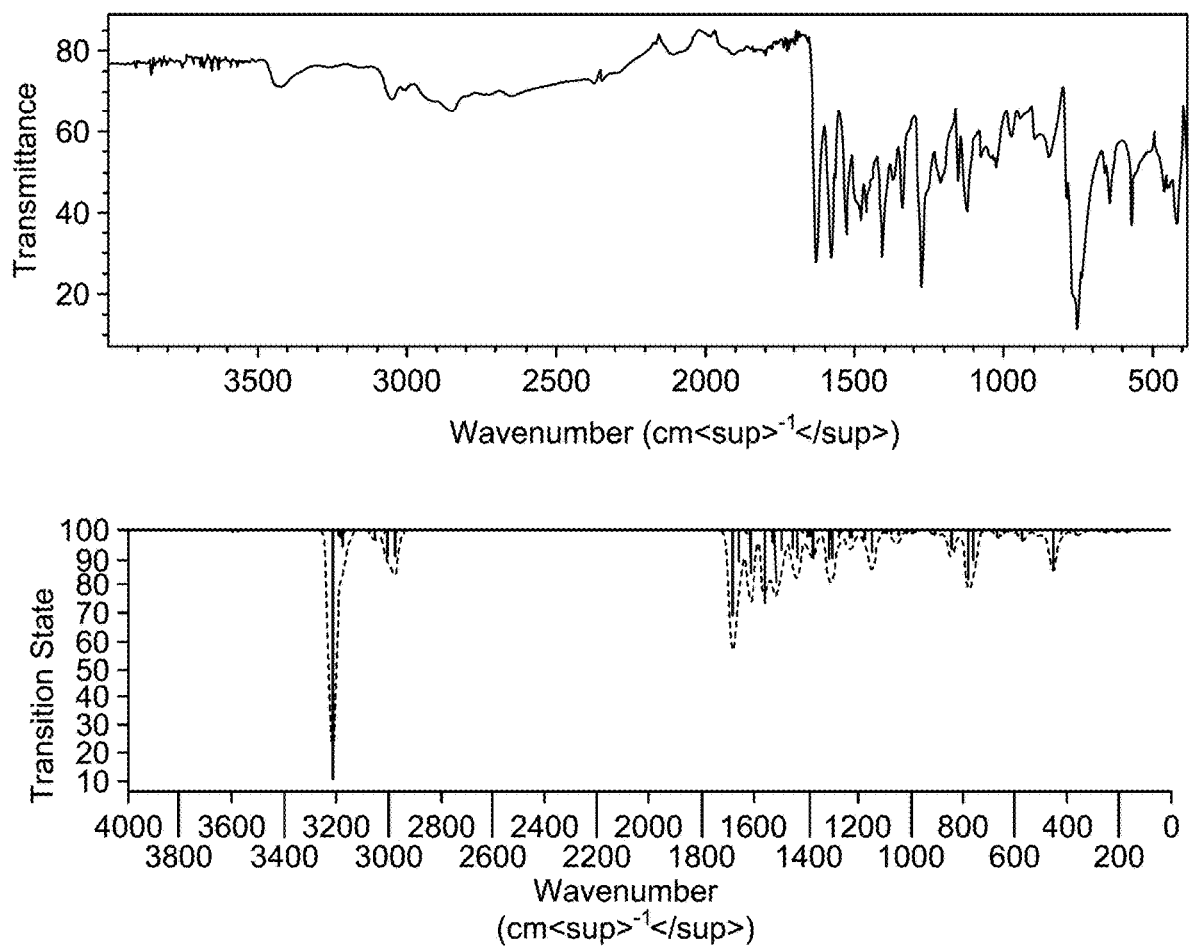
FIG. 23 shows a comparison of experimental and DFT predicted FT-IR spectra of S2, according to certain embodiments.

The geometric structure of the target compounds was calculated using the B3LYP functional along with the 6-311++G(d,p) basis set. FIG. 20 illustrates optimized ground state geometries of A56, S1 and S2. The naphthalene ring in compounds S1 and S2 lay in an orthogonal configuration with the isovanillin unit (S1) and salicylic unit (S2), with a dihedral angle of 1180 and 110° for both S1 and S2, respectively. This was likely due to the presence of an ethyl linker with sp$^3$ carbons, which broke the conjugation between the two units, i.e., naphthalene ($C_{10}H_8$) and isovanillin ($C_8H_8O_3$) or salicylate. The small dihedral angle was attributed to the hydroxyl functional group on the isovanillin unit in S1 and S2 which may have induced intramolecular hydrogen bonding with the azomethane moiety. At the same accuracy level, both the highest occupied molecular orbital (HOMO) and the lowest unoccupied molecular orbital (LUMO) were determined. FIG. 21 illustrates the HOMO, LUMO maps and energy gaps (Eg) of A56, S1 and S2. The HOMO was found to be localized over the naphthalene unit for S1 and S2, as shown in FIG. 21. While the LUMO was localized over the imine-isovanillin unit (S1) and the imine-salicylate the (S2). On the other hand, the HOMO level of A56 is localized over the tri-substituted phenyl ring along with the amine linker, while the LUMO was localized over the pyridine unit. Their HOMO values were –6.083 electron volts (eV), –5.214 eV and –5.371 eV while the LUMO are –2.138 eV, –1.372 eV and –1.741 eV for A56, S1 and S2, respectively. This corresponded to a calculated energy gap (Eg) of –3.95 eV, –3.84 eV, and –3.63 eV for A56, S1, and S2, respectively. In fact, all materials had a large Eg, which was suggested to facilitate high stability and large stabilizing interactions of the compounds with the receptor in protein-ligand interactions. IR frequency spectra for S1 and S2 were also predicted, and they showed a similar profile to those obtained experimentally. FIG. 22 shows a comparison of experimental and DFT predicted FT-IR spectra of S1 and FIG. 23 shows a comparison of experimental and DFT predicted FT-IR spectra of S2.

To predict the binding sites of the synthesized small molecules on the active site of the receptor and to explore potential interactions between them, molecular docking calculations were employed. Compound A56 was utilized as the reference inhibitor since it exhibited the most suppressive activity towards PD-L1 among the reported small molecule inhibitors. FIG. 24A illustrates A56 reference docked with the PDL-1 active site in three dimensions and its two-dimensional interactions. FIG. 24B illustrates the three dimensions and the two-dimensional interactions of the candidate S1.

Molecular docking results for A56 and S1-S7, as listed in Table 2. The binding affinities of the hits for the active site pocket of PD-L1 and their binding energies suggested that these compounds could be considered promising PD-L1 inhibitors. The binding affinity of the complexes formed by S1 and S2 with the PD-L1 receptor was close to that of the complex formed by the active inhibitor A56 with the PD-L1 receptor. This indicated that the complexes produced by S1 and S2 with the PD-L1 receptor might have a stability like that of A56, confirming that these molecules possess inhibitory potential. A56 was located between the dimerized form of PD-L1 and bound specifically to Tyr 56. The Schiff bases S1-S7 were docked against both the dimerized form and a single chain of PD-L1. When docked to chain A of PD-L1, the candidates attached effectively to the active pocket; however, when the dimerized version was considered, this binding was not observed. This outcome implies that the PD-L1 small molecule inhibitor binds to one chain prior to dimerization, becoming sandwiched and increasing PD-L1 beyond its normal size, thereby inhibiting its activity. A56 re-docking was performed with the series of tested compounds S1-S7 to verify the reliability of the docking results, depicting their interactions with the PD-L1 chain's active site residues. S2, S3, and S5 demonstrated the highest binding affinity to the PD-L1 receptor, over 68% of the conformers docked to the active pocket. This was attributed to the increase in the hydrophobic region of the biphenyl at the imine site. S2 exhibited a low energy score comparable to that of the reference inhibitor A56. The superior activity of S2 among all oxygenated compounds S1-S5 highlighted the significance of the ortho position occupied by the hydroxyl group.

Although the binding score energy of the S1, S4 and S7 was slightly lower than that of S2, they are still of interest for further examination, due to its ability to form hydrogen bonds with Asp 122.

Figure 25:
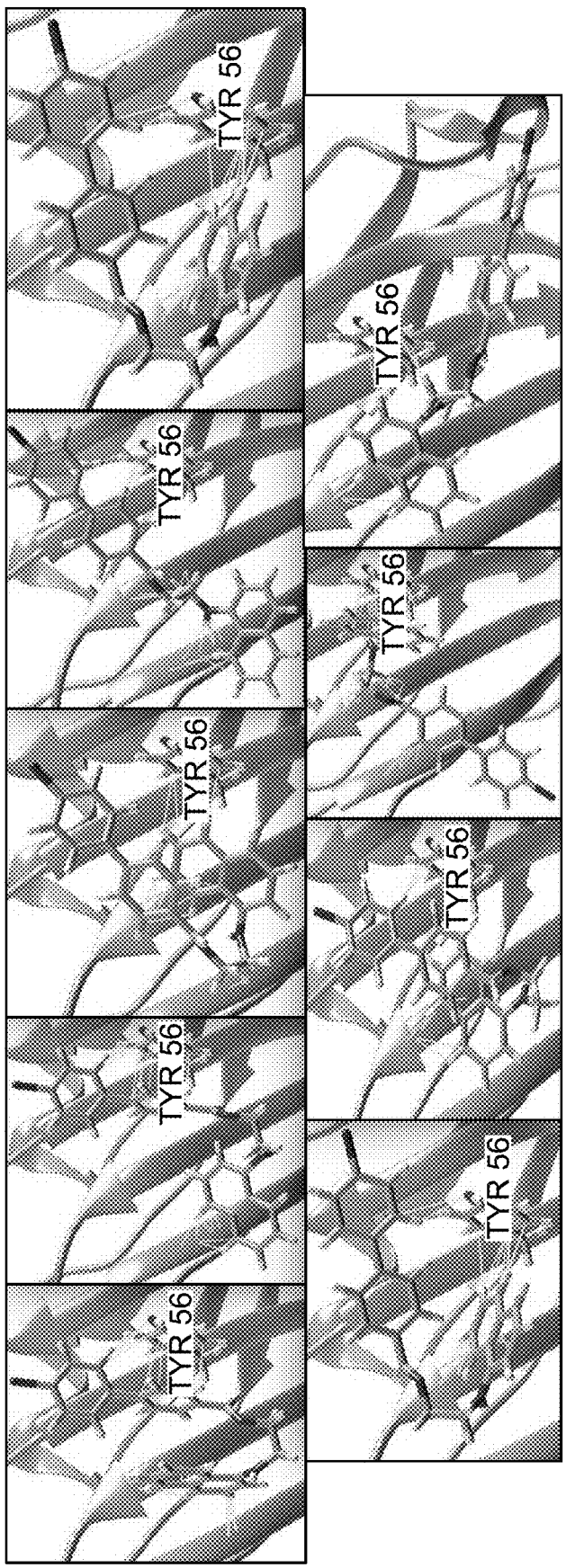
FIG. 25 illustrates van der Waals interactions between the naphthyl and biphenyl moieties of the D1 compound and the Tyr 56 active residue of PDL-1, according to certain embodiments.

To compare between naphthyl and biphenyl moieties, D1 interactions to the PDL-1 receptor were further examined. In six out of nine conformers of D1, the naphthyl moiety exhibited the ability to interact with Tyr 56 residues via van der Waals overlap. FIG. 25 illustrates van der Waals interactions between the naphthyl and biphenyl moieties of the D1 compound and the Tyr 56 active residue of PDL-1. The affinity of the naphthyl moiety in the S1 compound for the Tyr 56 residue was also observed at a higher rate. Consequently, the naphthyl moiety demonstrated an affinity for Ile 54 and Tyr 56 residues like that of the biphenyl moiety. Based on molecular docking results, the synthesized small molecules, S1-S7 might be potential PD-L1 inhibitors.

TABLE 2

The binding affinity of the synthetic ligand and designed compounds docked with PDL-1 chain.

| Compound ID | Score energy | RMSD | binding percent to active site | Hydrogen Bonds | van der Waals interactions |
|---|---|---|---|---|---|
| A56 | −6.9 to −6.5 | 0.0 to 10.09 | 55 | THR 22, LEU 48, SER 117, LYS 46, GLU 45 | PHE 19, THR 20, THR 22, LYS 41, PHE 42, PRO 43, VAL 44, GLU 45, LYS 46, GLN 47, LEU 48, ILE 54, ALA 52, TYR 56, ASN 63, GLN 66, HIS 69, VAL 76, SER 93, GLY 95, LEU 94, MET 115, ILE 116, SER 117, TYR 118, GLY 119, ALA 121, ASP 122, TYR 123, |
| S1 | −6.3 to −5.9 | 0.0 to 7.62 | 67 | VAL 44, TYR 118 | ILE 54, TYR 56, GLU 58, ASN 63, GLN 66, VAL 68, VAL 76, MET 115, ILE 116, SER 117, ALA 121, ASP 122, TYR 123, |
| S2 | −6.7 to 6.0 | 0.0 to 8.87 | 89 | SER 80, ASP 122 | ILE 54, TYR 56, GLU 58, ASN 63, VAL 68, VAL 76, SER 79, SER 80, ARG 82, ARG 84, LYS 105, GLN 107, MET 115, ILE 116, SER 117, ALA 121, ASP 122, TYR 123, HIS 144 |
| S3 | −5.7 to −5.6 | 14.2 to 19.18 | 78 | ARG 113, GLN 83, ASP 61 | ALA 18, PHE 19, THR 20, PRO 43, GLU 45, LYS 46, ILE 54, ILE 65, TYR 56, GLU 58, ASP 61, ASN 63, GLU 72, ASP 73, LEU 74, GLN 77, GLN 83, ARG 86, ARG 113, MET 115, ILE 116, SER 117, TYR 118, GLY 119, THR 20, ALA 121, ASP 122, TYR 123 |
| S4 | −5.7 to −5.2 | 0.0 to 5.74 | 67 | ARG 86, ARG 113 | PHE 19, LYS 41, PHE 42, PRO 43, VAL 44, GLU 45, LYS 46, LEU 50, ILE 54, TYR 56, GLY 70, ARG 86, LYS 89, ASP 90, LEU 92, LEU 94, ARG 113, MET 115, ILE 116, SER 117, TYR 118, PHE 19, GLY 120, ALA 121, ASP 122, TYR 123, |
| S5 | −6.0 to −5.5 | 0.0 to 10.74 | 78 | ARG 86, LYS 89, SER 117, GLY 119, GLU 72 | ILE 54, TYR 56, ASN 63, GLN 66, VAL 68, HIS 69, GLU 72, ASP 73, LEU 74, LYS 75, VAL 76, GLN 77, GLN 83, ARG 86, LYS 89, MET 115, ILE 116, SER 117, TYR 118, GLY 119, ALA 121, ASP 122, TYR 123, |
| S6 | −5.7 to −5.1 | 0.0 to 4.48 | 56 | TYR 118, GLU 45 | ALA 18, PHE 19, LYS 41, PHE 42, PRO 43, VAL 44, GLU 45, LYS 46, LYS 46, ALA 52, ILE |

TABLE 2-continued

The binding affinity of the synthetic ligand and designed compounds docked with PDL-1 chain.

| Compound ID | Score energy | RMSD | binding percent to active site | Hydrogen Bonds | van der Waals interactions |
| --- | --- | --- | --- | --- | --- |
| S7 | −5.9 to −5.5 | 0.0 to 7.12 | 67 | — | 54, TYR 56, SER 93, LEU 94, ARG 113, MET 115, ILE 116, SER 117, TYR 118, GLY 119, GLY 120, ALA 121, ASP 122, TYR 123, ILE 54, TYR 56, GLU 58, ASN 63, GLN 66, VAL 76, MET 115, ILE 116, SER 117, ASP 122, TYR 123, |

Figure 26A:
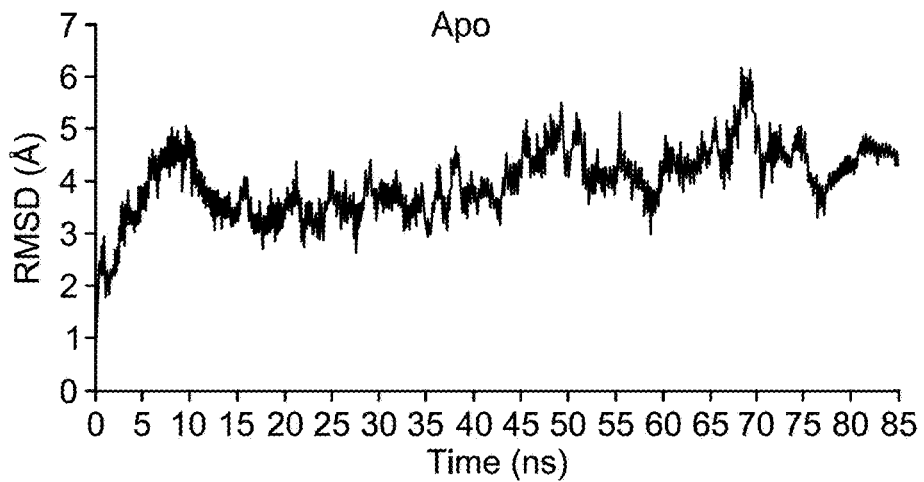
FIG. 26A shows root-mean-square deviation (RMSD) values of the simulated PD-L1 Apo using initial conformation as a reference throughout the production runs, according to certain embodiments.
Figure 26B:
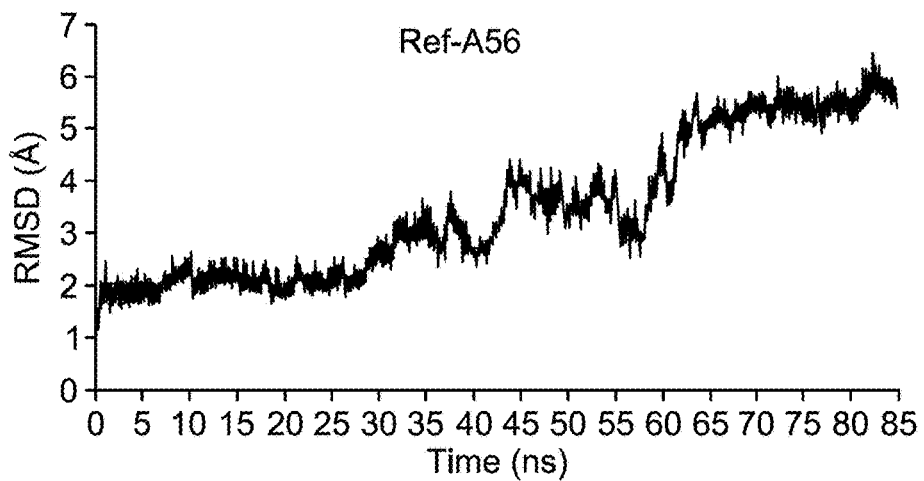
FIG. 26B shows RMSD values of the simulated PD-L1 Apo with complex A56 using initial conformation as a reference throughout the production runs, according to certain
Figure 26C:
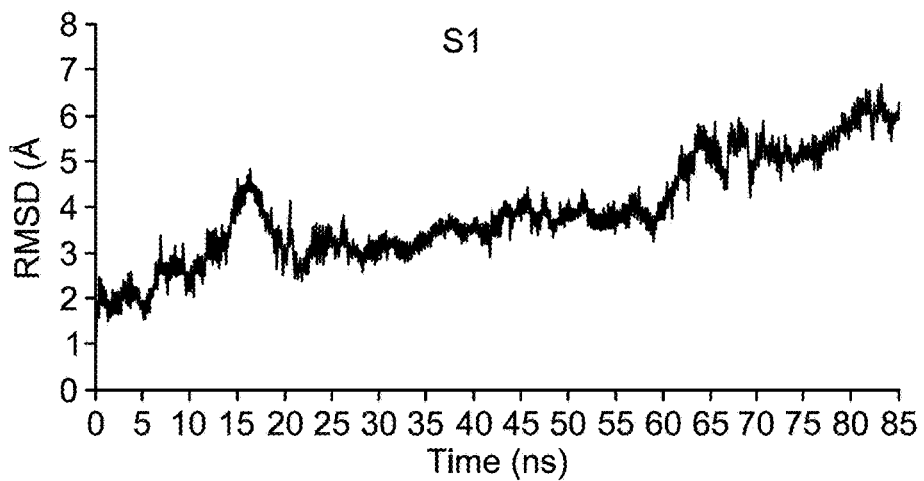
FIG. 26C shows RMSD values of the simulated PD-L1 Apo with complex S1 using initial conformation as a reference throughout the production runs, according to certain embodiments.
Figure 27A:
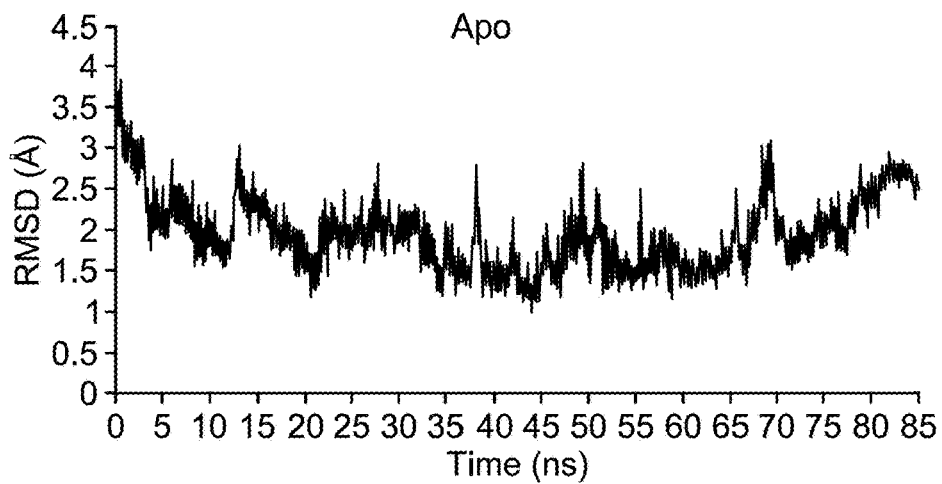
FIG. 27A shows RMSD values of the simulated PD-L1 Apo using average conformational model as a reference throughout the production runs, according to certain embodiments.
Figure 27B:
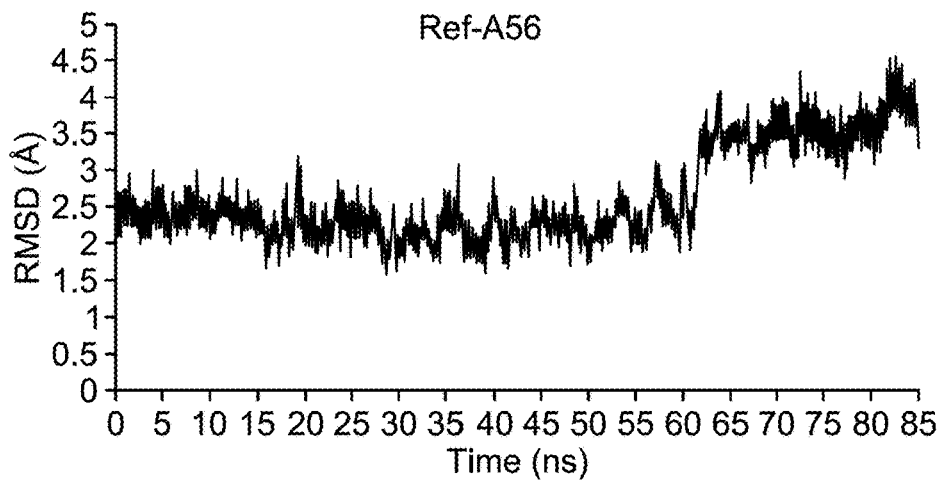
FIG. 27B shows RMSD values of the simulated PD-L1 Apo with complex A56 using average conformational model as a reference throughout the production runs, according to certain embodiments.
Figure 27C:
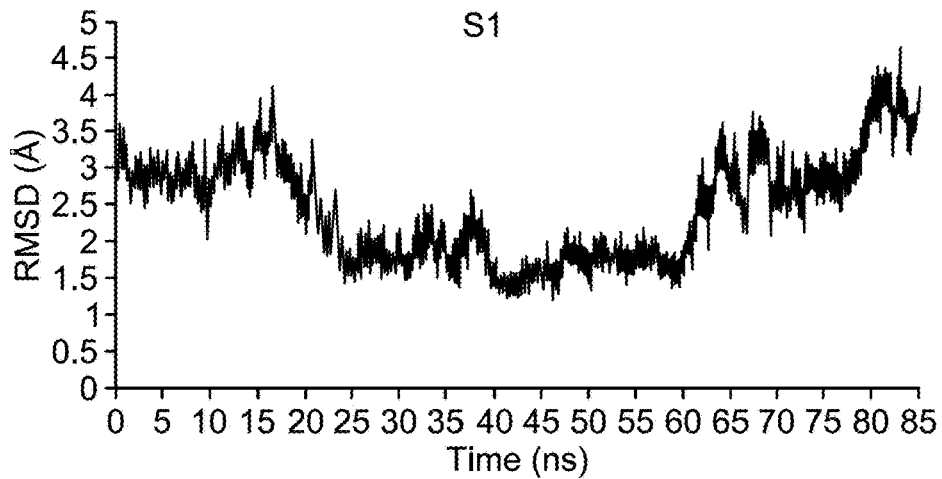
FIG. 27C shows RMSD values of the simulated PD-L1 Apo with complex S1 using average conformational model as a reference throughout the production runs, according to certain embodiments.

The stability of the complexes was studied by analyzing root mean square deviations (RMSDs), as shown in FIG. 26A-26C. The RMSDs were calculated along the trajectories to quantify the difference between the initial structural conformation of the PD-L1 backbone and its final placement. The RMSD values of the simulated PD-L1 Apo and its complexes with A56 and S1 using initial conformation as a reference throughout the production runs is shown in FIG. 26A-26C, respectively. At the beginning of the MID run, the RMSD value of the Apo protein PD-L1 exhibited a sudden increase before stabilizing at 15 ns with slightly larger fluctuations. The S1-PDL-1 system's MD simulation stabilized at 20 ns and showed had comparatively less fluctuations. At 60 ns, the RMSD value gradually increased in a manner reminiscent of the A56-PDL-1 system, which had been stabilized first. The RMSDs of the PD-L1 backbone of the Apo, A56, and S1 systems in relation to the average conformational models is shown in FIG. 27A-27C, respectively. Clearly, the S1 system stabilized from 25 ns up to 60 ns. Beyond this point, the PD-L1 complex backbone's RMSD values increased in both the A56 and S1 systems, but not in the Apo protein. The PDL-1 protein's conformational change at the beginning of the simulation aligned with findings of the previous studies.

Figure 28A:
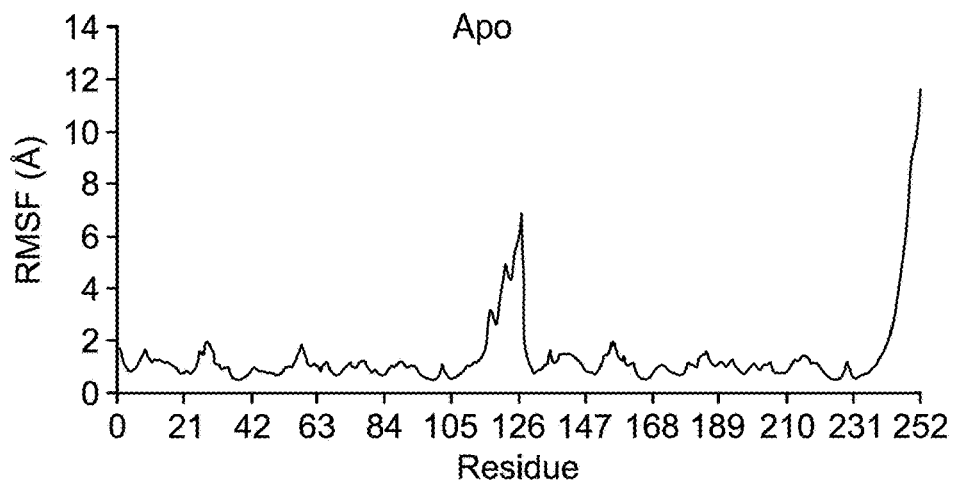
FIG. 28A shows root-mean-square fluctuations (RMSF) of the simulated PD-L1 Apo throughout the production runs of the 85 nanosecond (ns) trajectory, according to certain embodiments.
Figure 28B:
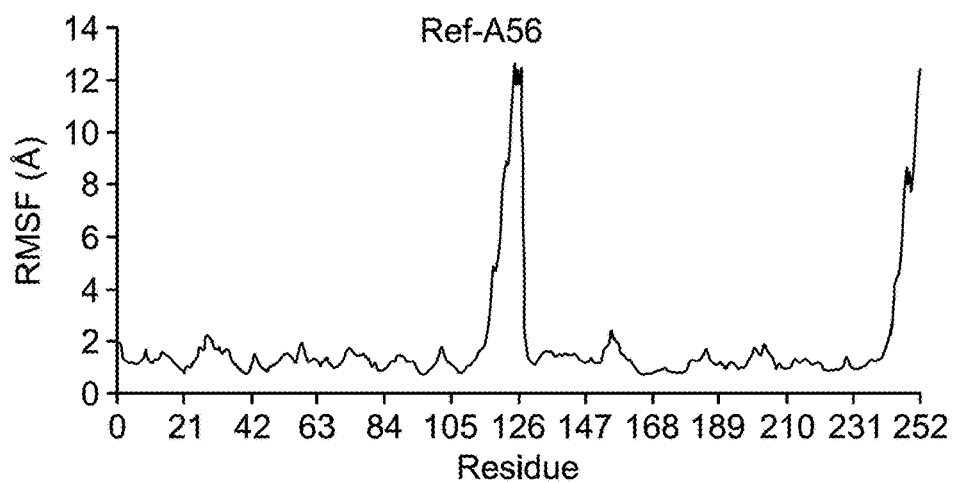
FIG. 28B shows RMSF of the simulated PD-L1 Apo with complex A56 throughout the production runs of the 85 ns trajectory, according to certain embodiments.
Figure 28C:
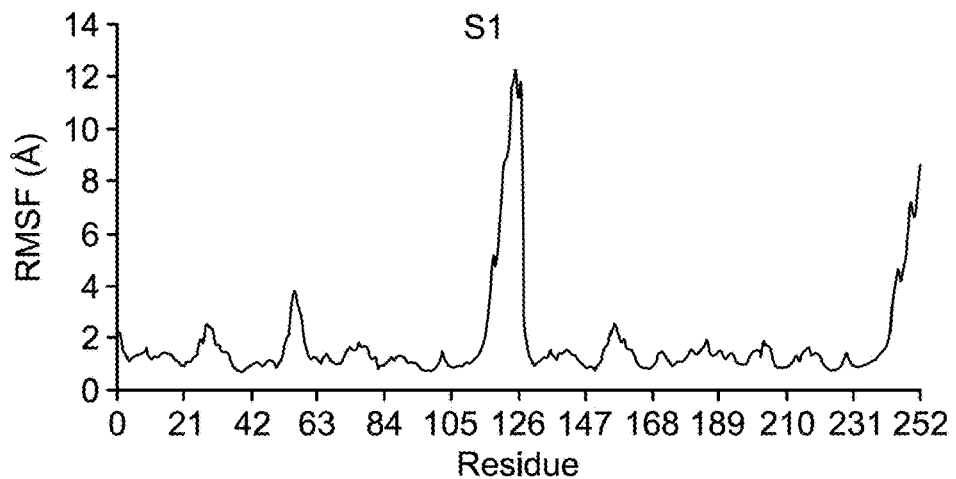
FIG. 28C shows RMSF of the simulated PD-L1 Apo with complex S1 throughout the production runs of the 85 ns trajectory, according to certain embodiments.

The stability of the complexes was also estimated using root mean square fluctuations (RMSF), showing RMSF of the simulated PD-L1 Apo and its complexes with A56 and S1 throughout the production runs of the 85 ns trajectory is shown in FIG. 28A-28C, respectively. The fluctuations differences in fluctuations in the backbone residues of the simulated PD-L1 Apo and its complexes with A56 and S1 were observed. Unexpectedly, A56 and S1 had fluctuations that were greater than those of the apo protein, suggesting an overall increase in PDL-1's degree of flexibility. Compared to the apo protein, PD-L1 flexibility and movement at residues 50 to 60 is enhanced because of S1 complexation. These observations indicate that A56 and S1 complexations have caused a conformational change in the PD-L1 protein that affected its function, particularly in the terminal residue from Pro 116 to His 127. This finding was further supported by RMSF analysis, as reported by a researcher. The observed activity in these residues likely inhibited PD-L1 by preventing its binding to the PD-1 receptor.

In the field of drug discovery, compounds must have not only strong biological activity but also a good pharmacokinetic profile to be considered as potential drug candidates. Therefore, examining the pharmacokinetics profile of proposed compounds was essential to determine whether the compounds meet the specific criteria for being potential inhibitors of PD-L1. Hence, the drug-likeness of S1 and S2 molecules was assessed using the Swiss ADME online tool. In the present disclosure, the compounds passed all drug-likeness tests, including the Lipinski, Chose, Weber, Egan and Muegge rules. The compound also has good pharmacokinetic properties including good gastrointestinal absorption, and blood-brain barrier permeability.

The development of inhibitors that blocked the programmed death 1 and its PD-L1 pathway represents a leap forward in immunotherapy of various tumors that have been challenging to treat. Even though the US-FDA has approved a number of monoclonal antibody drugs, no small-molecule PD-L1 inhibitor has been approved. Researchers have been exploring various approaches to develop small molecules inhibitors of PD-L1 to overcome the disadvantages monoclonal antibody drugs. These small-molecule such as biphenyl moieties, benzamide scaffold, indane scaffold, benzo[d]isoxazole scaffold, difluoromethyleneoxy linkage, pyrazolo [4, 3-b]pyridine derivatives, imidazopyridines, and peptide antagonists have been analyzed.

The present disclosure obtained 1-naphthalenyl aminoethyl Schiff base derivatives, synthesized by combining a lipophilic side and a hydrophilic aromatic functionalized unit, linked together by the aminoethyl group through a Schiff base functional group as potential PD-L1 inhibitors. The synthesized compounds were characterized using different spectroscopic techniques. The electronic properties of the best candidates, utilizing DFT with the B3LYP functional method and 6-311++G(d,p) basis set, revealed a large energy gap (Eg), suggesting high stability and strong stabilizing interactions with the PD-L1 receptor. From docking analysis, the docking scores of the compounds S1 and S2 derivatives were comparable to that of the compound A56, the reference inhibitor used in the present analysis. Their binding affinities were −6.3 kilocalorie per mole (kcal/mol) and −6.7 kcal/mol, with binding percentages of 67% and 100%, respectively. An 85 ns MD simulation evaluated the significance of S1/PD-L1 and A56/PD-L1 complexes compared to PD-L1 apo. The MD shed light for the first time on the role of the terminal residues 116-127 in PD-L1 dimerization. The ADME results indicated that these Schiff base compounds possess favorable drug-likeness properties. This disclosure offers valuable insights into the 1-naphthalenyl aminoethyl Schiff base for PD-L1 inhibition in cancer immunotherapy.

The present disclosure provides an easy and straightforward synthesis of small molecules bearing a 1-naphthalenyl aminoethyl Schiff base scaffold as potential PD-L1 inhibitors. Molecular docking emphasized the importance of polar aromatic groups in forming hydrogen bonds and highlighted the aminoethyl Schiff base linkage role in enhancing binding strength. The biphenyl with halogen substituent in the reference inhibitor A56 did not form hydrogen bonds. S2 showed low binding energy to the active site of the PD-L1 receptor comparable to that of A56. Additionally, the present disclosure demonstrated that molecular docking should be performed on the monomeric form of the PD-L1 and not on its dimer form in order to obtain small molecular weight inhibitors. The molecular dynamics simulation confirmed the significance of the terminal residues 116-127 on the PD-L1 protein for dimerization. The ADME results indicated the safe nature of these Schiff base compounds with good drug-likeness properties. S1 and S2 were identified as promising candidates for further in vitro examination. Overall, the present analysis provided valuable insights into the synthesis and structural properties of the 1-naphthalenyl aminoethyl Schiff base scaffold for potential application in cancer immunotherapy as PD-L1 inhibitors.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of inhibiting the binding of a programmed death-ligand 1 (PD-L1) protein to programmed cell death protein 1 (PD-1), comprising:
   contacting the PD-L1 protein with an aminoethyl Schiff base of formula (II) to form a complex of the PD-L1 protein and the aminoethyl Schiff base of formula (II), thereby inhibiting the binding of PD-L1 to PD-1;
   wherein the aminoethyl Schiff base of formula (II) is prepared by:
   reacting an N-(naphthyl)-ethylenediamine dihydrochloride with an aldehyde of formula (I) in ethanol in the presence of sodium bicarbonate (NaHCO$_3$) to form a reaction mixture; and
   refluxing the reaction mixture for 3 hours (h) to 7 h to form the aminoethyl Schiff base of Formula (II);

formula (I)

formula (II)

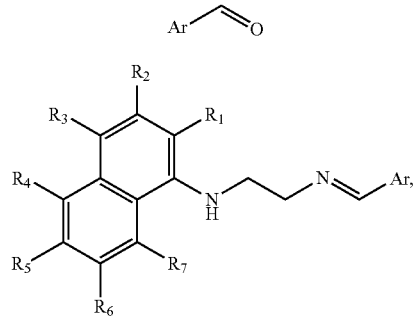

wherein Ar is selected from the group consisting of:

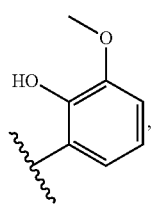
S1

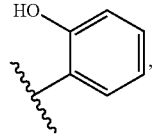
S2

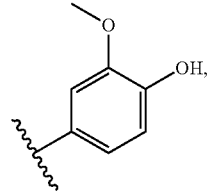
S3

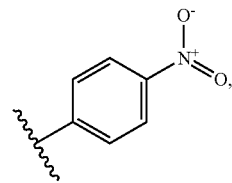
S4

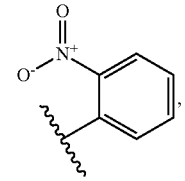
S5

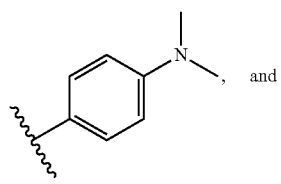
, and
S6

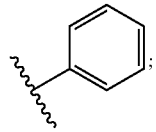
;
S7

$R_1$, $R_2$, $R_3$, $R_4$, $R_5$, $R_6$, and $R_7$ are hydrogen, nitro, or methoxy.

2. The method of claim 1, wherein the reacting comprises stirring the reaction mixture at a temperature of 20 to 25 degrees Celsius (° C.) for 1 to 3 h.

3. The method of claim 1, wherein a molar ratio of N-(naphthyl)-ethylenediamine dihydrochloride to NaHCO$_3$ is 1:5 to 5:1.

4. The method of claim 1, wherein the N-(naphthyl)-ethylenediamine dihydrochloride is at least one selected from the group comprising N-(4-nitro-1-naphthyl)ethylenediamine dihydrochloride, N-(2-nitro-1-naphthyl)ethylenediamine dihydrochloride, N-(1-methoxynaphthyl)ethylenediamine A dihydrochloride, and N-(1-naphthyl)ethylenediamine dihydrochloride.

5. The method of claim 1, wherein the aminoethyl Schiff base has a Fourier transform infrared (FT-IR) spectrum comprising a wide absorption band at 200 nanometer (nm) to 385 nm.

6. The method of claim 1, wherein the refluxing comprises refluxing for about 5 h.

7. The method of claim 1, wherein the N-(naphthyl)-ethylenediamine dihydrochloride is N-(1-Naphthyl)ethylenediamine dihydrochloride.

8. The method of claim 1, wherein a molar ratio of N-(naphthyl)-ethylenediamine dihydrochloride to $NaHCO_3$ is 1:3 to 1:2.

9. The method of claim 1, wherein the aminoethyl Schiff base has a binding percent of at least 60% to the PDL-1 protein.

10. The method of claim 1, wherein the reacting comprises stirring the reaction mixture at a temperature of 20 to 25° C. for about 2 h.

11. The method of claim 1, wherein the aminoethyl Schiff base has a binding percent of at least 75% to the PD-L1 protein.

12. The method of claim 1, wherein the aminoethyl Schiff base has a binding affinity of at least −6 kilocalories per mole (kcal/mol) to the PD-L1 protein.

13. The method of claim 1, wherein the aminoethyl Schiff base has an FT-IR spectrum comprises a maximum absorption at 200 to 255 nm and at 300 to 340 nm.

14. The method of claim 1, wherein the aminoethyl Schiff base has a binding affinity of at least −6.5 kcal/mol to the PD-L1 protein.

15. The method of claim 1, wherein the aminoethyl Schiff base has an optical band gap ($E_{opt}$) of 2.50 to 3.50 electron volt (eV).

16. The method of claim 1, wherein the aminoethyl Schiff base has an optical band gap ($E_{opt}$) of 2.77 to 3.40 eV.

* * * * *